(12) United States Patent
Takahashi et al.

(10) Patent No.: US 8,369,207 B2
(45) Date of Patent: Feb. 5, 2013

(54) FAILURE RECOVERY METHOD, COMPUTER SYSTEM, AND STORAGE MEDIUM RECORDED FAILURE RECOVERY PROGRAM FOR A STREAM DATA PROCESSING SYSTEM

(75) Inventors: Noriaki Takahashi, Yokohama (JP); Satoru Watanabe, Yokohama (JP); Tomohiro Hanai, Tachikawa (JP)

(73) Assignee: Hitachi, Ltd., Tokyo (JP)

( * ) Notice: Subject to any disclaimer, the term of this patent is extended or adjusted under 35 U.S.C. 154(b) by 423 days.

(21) Appl. No.: 12/644,973

(22) Filed: Dec. 22, 2009

(65) Prior Publication Data

US 2010/0232286 A1    Sep. 16, 2010

(30) Foreign Application Priority Data

Mar. 13, 2009 (JP) ................. 2009-060783

(51) Int. Cl.
*G06F 11/00* (2006.01)
(52) U.S. Cl. ....................... 370/216; 370/242
(58) Field of Classification Search .......... 370/216–218, 370/241, 242, 245
See application file for complete search history.

(56) References Cited

U.S. PATENT DOCUMENTS 6,044,216 A * 3/2000 Bhargava et al. ............. 717/114
6,122,754 A * 9/2000 Litwin et al. .................... 714/4.3
6,347,322 B1 * 2/2002 Bogantz et al. ........................ 1/1

OTHER PUBLICATIONS

Jeong-Hyon Hwang et al., "High-Availability Algorithms for Distributed Stream Processing," Proceedings of the 21$^{st}$ International Conference on Data Engineering, (ICDE 2005), Apr. 2005, 12 pgs.
R. Motwani et al., "Query Processing, Resource Management, and Approximation in a Data Stream Management System," Proceedings of the 2003 CIDR Conference, Jan. 2003, 12 pgs.
Japanese Patent Office action on application No. 2009-060783 dated Jul. 26, 2011; 3 pages.

* cited by examiner

*Primary Examiner* — Yemane Mesfin
*Assistant Examiner* — Mon Cheri Davenport
(74) *Attorney, Agent, or Firm* — Foley & Lardner LLP

(57) ABSTRACT

Provided is a failure recovery method for switching to a standby system if a failure occurs in an active system, which allows reduction of loads on the standby system and a network. A computer system, which receives data to which timestamp information is appended in a chronological order and processes the received data by registered queries, includes the active system for processing the received data and the standby system for processing the received data instead of the active system upon occurrence of a failure. The active system processes the received data by the respective queries according to a predefined sequence, and transmits results obtained from the received data by the respective queries to the standby system as intermediate data on a query basis at a predetermined timing. The standby system restores the data by processing the received data and the intermediate data if a failure occurs in the active system.

27 Claims, 20 Drawing Sheets

```
//QUERY DEFINITION
register stream AccessLog_Squid (
        :
        :
);
register query LoginCount1 ISTREAM (
        :
    SELECT * FROM AccessLog_Squid [RANGE 60 SECOND]
);
register query LoginCount2 ISTREAM (
        :
    SELECT * FROM LoginCount1 [RANGE 60 SECOND]
);
register query FilterRule1 (
        :
    SELECT * FROM LoginCount2 [NOW]
);
register query LoginRule1 (
        :
    SELECT * FROM FilterRule1 [NOW]
);
register query FilterRule2 (
        :
    SELECT * FROM LoginCount2 [NOW]
);
register query LoginRule2 (
        :
    SELECT * FROM FilterRule2 [NOW]
);
```

*FIG. 3*

```
//QUERY GROUP DEFINITION
input_data_number = LoginCount1,  100
input_data_number = LoginCount2,  50
query_group = LoginCount1
query_group = LoginCount2
query_group = FilterRule2
memory_copy_interval = 10
```

```
SELECT COUNT(*)
   FROM Requests S [Range 1 Day Preceding]
   WHERE S.domain = 'stanford.edu';
```

*FIG. 22*

FAILURE RECOVERY METHOD, COMPUTER SYSTEM, AND STORAGE MEDIUM RECORDED FAILURE RECOVERY PROGRAM FOR A STREAM DATA PROCESSING SYSTEM

CLAIM OF PRIORITY

The present application claims priority from Japanese patent application JP 2009-060783 filed on Mar. 13, 2009, the content of which is hereby incorporated by reference into this application.

BACKGROUND OF THE INVENTION

This invention relates to a technology for recovering a failure in a stream data processing system.

Up to now, a database management system (hereinafter, referred to as "DBMS") plays a dominant role in data management for a corporate information system. In the DBMS, data to be processed is stored in a storage system, and a highly-reliable processing typified by a transaction processing is realized for the stored data.

In contrast, in recent years, there is an increasing demand for a data processing system which performs a real-time processing on a large amount of data arriving from moment to moment. For example, in a case of a financial application for assisting stock trading, it is one of the most important challenges for the system how to quickly respond to stock price fluctuations. With a system such as the conventional DBMS for temporarily storing stock data in a storage system and then retrieving the stored data, there is a fear that the speed of the stock price fluctuations cannot be coped with.

Therefore, a stream data processing system is proposed as a data processing system suitable for a real-time data processing as described above. For example, a stream data processing system called "STREAM" is disclosed in R. Motwani, J. Widom, A. Arasu, B. Babcock, S. Babu, M. Datar, G. Manku, C. Olston, J. Rosenstein and R. Varma: "Query Processing, Resource Management, and Approximation in a Data Stream Management System", In Proc. of the 2003 Conf. on Innovative Data Systems Research (CIDR), January 2003.

In the stream data processing system, unlike the conventional DBMS, queries are previously registered in the system, and the registered queries are continuously executed in response to the arrival of the data. The term "stream data" used herein is not a large item of logically-continuous data such as a video stream, but represents a large amount of time-series data of relatively small items that are logically independent of each other including stock-price feed data for a financial application, POS data for a retail trade, probe car data for a traffic information system, an error log for computer system management, and sensing data generated from a ubiquitous device such as a sensor or an RFID. To process the stream data in real time is called "stream processing".

The stream data keeps arriving at the system, thereby making it impossible to perform the processing in real time if the processing is started after waiting until the end of the arrival. In addition, data items that have arrived at the system must be processed in arrival order without being affected by the load on the data processing.

The system "STREAM" has introduced a notion called a sliding window (hereinafter, referred to simply as "window") for realizing a real-time processing by cutting out a part of the stream data items that are arriving at the system by specifying the width of a time period such as latest 10 minutes or the width of the number of items such as latest 1,000 items.

As a preferable example of a description language for queries including such a window specification, Continuous Query Language (CQL) is disclosed in above-described "Query Processing, Resource Management, and Approximation in a Data Stream Management System". CQL has been developed by extending Structured Query Language (SQL), which is widely used for the DBMS, so as to be capable of the window specification.

FIG. 22 is a diagram illustrating an example of CQL. A query 2201 illustrated in FIG. 22 is an example of the query described in above-described "Query Processing, Resource Management, and Approximation in a Data Stream Management System".

The query 2201 is a query for calculating a total count of access that has been made to a certain web proxy server from the domain "stanford.edu" for one day. "Requests" represents web access data that has keep arriving at the web proxy server, and is not quiescent data such as a table to be handled in the DBMS but continuous stream data. Therefore, the total count of the access cannot be calculated without specifying which part of the stream data to be a subject as in the window specification "[Range 1 Day Preceding]".

The stream data cut out by the window is retained in the memory and used for a query processing. As typical window specification methods, there are a "Range" window (hereinafter, referred to as "time window") for specifying the width of the window by the time period and a "Row" window (hereinafter, referred to as "row window") for specifying the width of the window by the number of data items. For example, if the time window is set to 10 minutes, data items for the latest 10 minutes are to be subjects of the query processing, and if the row window is set to the number of 10, the latest 10 data items are to be subjects of the query processing.

Meanwhile, as a method of recovering the stream data processing system, Hwang, J.-H. Balazinska, M. Rasin, A. Cetintemel, U. Stonebraker, M. Zdonik, S.: "High-Availability Algorithms for Distributed Stream Processing" Proceedings of the 21st International Conference on Data Engineering, (ICDE2005) April 2005 discloses an ActiveStandby scheme in which an active system and a standby system are caused to operate even in a normal mode and a PassiveStandby scheme in which memory is periodically copied from the active system to the standby system.

In the ActiveStandby scheme, data is transmitted from a data transmission application to both the active system and the standby system, which both perform the stream data processing. Then, in a result reception application, a check is performed on consistency between output stream data output from the active system and output stream data output from the standby system, and only the output stream data output from one of the systems is handled. Even if a failure occurs in the active system, the standby system is constantly operating, and hence a stream processing system can be continued by switching to the standby system.

In the PassiveStandby scheme, an input stream is subjected to the stream processing in the active system, while the input stream data is buffered without being subjected to the stream processing in the standby system, and processing results in the active system are periodically copied to the standby system. If a failure occurs in the active system, the stream processing system can be continued by processing the input stream data starting from the memory that has been copied to the standby system.

SUMMARY OF THE INVENTION

In order to provide a highly-reliable stream data processing system, it is necessary to prepare a backup system. Further in the stream data processing system, a large amount of stream data arriving from moment to moment needs to be processed in real time, and hence the system must be quickly recovered from the failure.

However, according to the technology disclosed in above-described "High-Availability Algorithms for Distributed Stream Processing", in the ActiveStandby scheme, the standby system is operating in the same manner as the active system even in the normal mode in which the active system is operating normally, which leads to a problem that many resources may be consumed.

Further, in the PassiveStandby scheme, all of contents of the memory within the stream data processing system need to be copied to the standby system constantly, and hence huge load may be imposed on a network by transferring an enormous memory amount therethrough. In addition, the standby system may produce huge overhead by receiving an enormous amount of information.

It is an object of this invention to provide a technology for quickly recovering a stream data processing system without increasing load on a standby system and a network if a failure occurs in an active system.

The representative aspects of this invention are as follows. That is, there is provided a failure recovery method for a computer system which receives data to which timestamp information is appended in a chronological order and processes the received data by a plurality of queries that are registered in advance, the computer system including a plurality of computers, each of the plurality of computers having: an interface for receiving the data; a memory for storing the data received via the interface; and a processor for processing the data stored in the memory, the plurality of computers including: a first computer for outputting results obtained by processing the received data by the plurality of queries; and a second computer for processing the received data in place of the first computer in a case where a failure occurs in the first computer, the plurality of queries being provided with a predefined sequence in which items of the received data are processed, the failure recovery method including the steps of: receiving the data by each of the first computer and the second computer; processing, by the first computer, the items of the received data in order by the plurality of queries in accordance with the predefined sequence; storing, by the first computer, the processing results obtained from the received data on a query basis into the memory of the first computer as intermediate data; transmitting, by the first computer, the intermediate data corresponding to a part of the plurality of queries to the second computer at a predetermined timing; storing, by the second computer, the intermediate data transmitted from the first computer into the memory of the second computer; and restoring, by the second computer, in a case where a failure occurs in the first computer, the data stored in the memory of the first computer into the memory of the second computer by processing the data received by the second computer and the intermediate data transmitted from the first computer.

According to the representative embodiment of this invention, it is possible to quickly recover the computer system from the failure while suppressing the load on the network and resource consumption on the standby system (second computer).

BRIEF DESCRIPTION OF THE DRAWINGS

The present invention can be appreciated by the description which follows in conjunction with the following figures, wherein:

FIG. 3 is a diagram illustrating an example of a definition of queries executed by the stream processing module according to the embodiment of this invention;

FIG. 22 is a diagram illustrating an example of CQL.

DETAILED DESCRIPTION OF THE PREFERRED EMBODIMENT

Hereinafter, detailed description is made of an embodiment for carrying out this invention by referring to the accompanying drawings.

Figure 1:
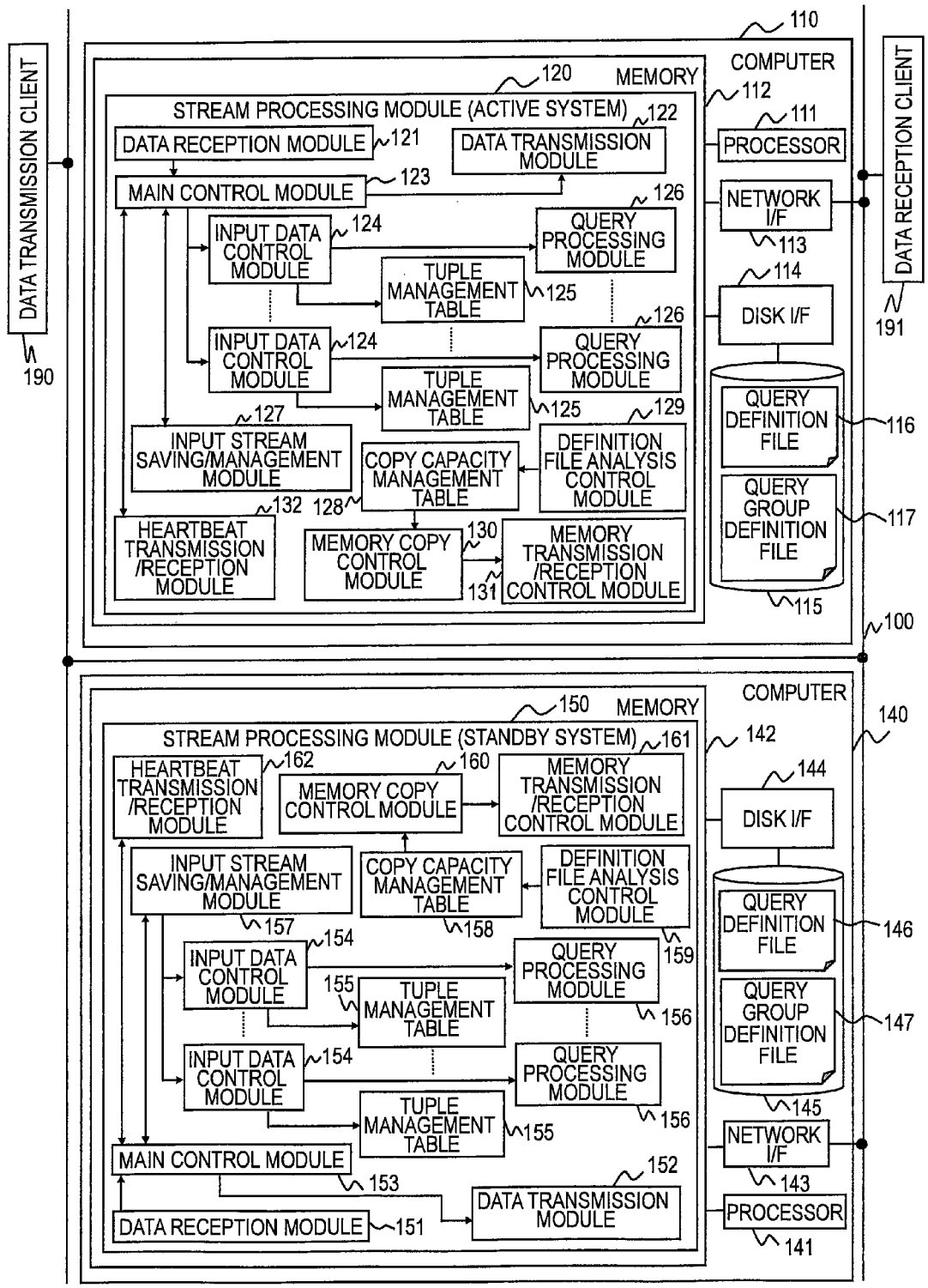
FIG. 1 is a diagram illustrating a configuration of a computer system and relationships between respective components thereof according to a embodiment of this invention.

FIG. 1 is a diagram illustrating a configuration of a computer system and relationships between respective components thereof according to the embodiment of this invention.

The computer system according to the embodiment of this invention includes a computer 110 of an active system and a computer 140 of a standby system. The computer 110 of the active system and the computer 140 of the standby system are connected to each other via a network 100. The computer 140 of the standby system processes stream data in place of the computer 110 of the active system in a case where a failure has occurred on the computer 110 of the active system or other such case.

Further connected to the computer 110 of the active system and the computer 140 of the standby system are a data transmission client 190 and a data reception client 191. The data transmission client 190 transmits unprocessed stream data to the computer 110 and the computer 140. The data reception client 191 receives a processing result of the stream data processed by the computer 110 or the computer 140.

The computer 110 includes a processor 111, a memory 112, a network interface (I/F) 113, a disk interface 114, and a hard disk drive 115.

The processor 111 executes various application processings by processing a program stored in the memory 112. For example, by execution of a predetermined program, the processor 111 applies a predefined query to the received stream data to thereby acquire a processing result.

The memory 112 stores a program executed by the processor 111 and data used when the program is executed. The program and the data stored in the memory 112 are described later.

The network interface 113 represents an interface used for connection to the network 100. The disk interface 114 represents an interface used for connection between the processor 111 or the like and the hard disk drive 115.

The hard disk drive 115 stores a file in which queries are defined and the like. Specifically, the hard disk drive 115 stores a query definition file 116 in which defined queries are recorded and a query group definition file 117 in which definition information on groups for managing the defined queries are recorded. Details of the query definition file 116 are described later by referring to FIG. 3. Details of the query group definition file 117 are described later by referring to FIG. 4.

A stream processing module 120 is stored in the memory 112. The stream processing module 120 includes a program and data. By executing the program included in the stream processing module 120, the processor 111 processes the stream data transmitted from the data transmission client 190, and transmits the processing result to the data reception client 191. Further, the stream processing module 120 includes a plurality of programs.

Meanwhile, in the same manner as the computer 110, the computer 140 includes a processor 141, a memory 142, a network interface 143, a disk interface 144, and a hard disk drive 145. The functions of the respective components are the same as those of the computer 110.

The memory 142 stores a stream processing module 150 as on the computer 110. The processor 141 executes the stream processing module 150 to thereby execute various processings. The computer 140 is of the standby system, and hence the processings executed thereon are different from those executed on the computer 110 of the active system. However, as described above, the computer 140 of the standby system processes the stream data in place of the active system if a failure occurs on the computer 110 of the active system, and hence the stream processing module 120 and the stream processing module 150 have the same components and are capable of executing the same processings.

The stream processing module 120 includes a data reception module 121, a data transmission module 122, a main control module 123, a tuple management table 125, an input data control module 124, a query processing module 126, an input stream saving/management module 127, a copy capacity management table 128, a definition file analysis control module 129, a memory copy control module 130, a memory transmission/reception control module 131, and a heartbeat transmission/reception module 132.

The data reception module 121, the data transmission module 122, the main control module 123, the input data control module 124, the query processing module 126, the input stream saving/management module 127, the definition file analysis control module 129, the memory copy control module 130, the memory transmission/reception control module 131, and the heartbeat transmission/reception module 132 are programs executed by the processor 111.

In the embodiment of this invention, the input data control module 124, the tuple management table 125, and the query processing module 126 are generated for each of the defined queries. Further, the stream processing module 150 includes the corresponding components.

The data reception module 121 and a data reception module 151 receive stream data via the network 100 from an external portion. The data transmission module 122 and a data transmission module 152 transmit the processed stream data via the network 100 to the external portion.

The main control module 123 and a main control module 153 control an entire stream data processing. The tuple management table 125 and a tuple management table 155 store therein an input tuple on a query basis. The input data control module 124 and an input data control module 154 manage the input tuple stored in the tuple management table 125 and the tuple management table 155, respectively. The query processing module 126 and a query processing module 156 perform a defined query processing.

The input stream saving/management module 127 and an input stream saving/management module 157 save the input stream data in order to continue the processing in the standby system if a failure occurs in the active system.

The copy capacity management table 128 records memory copy information for copying information stored in the memory 112 to the standby system. The definition file analysis control module 129 reads the query definition file 116 and the query group definition file 117, and sets the memory copy information in the copy capacity management table 128.

In the same manner, a copy capacity management table 158 records memory copy information for copying information stored in the memory 142 to the standby system in a case where the computer 140 of the standby system operates in place of the active system. In the same manner, a definition file analysis control module 159 reads a query definition file 146 and a query group definition file 147, and sets the memory copy information in the copy capacity management table 158.

The memory copy control module 130 manages an information amount to be copied based on the copy capacity management table 128, and further copies the received information on a query basis. In the same manner, a memory copy control module 160 manages an information amount to be copied based on the copy capacity management table 158, and further copies the received information on a query basis.

The memory transmission/reception control module 131 and a memory transmission/reception control module 161 control transmission/reception of the information stored in the memory performed between the active system and the standby system. The heartbeat transmission/reception module 132 and a heartbeat transmission/reception module 162 transmit/receive an operation status notification between the active system and the standby system.

Here, description is made of an outline of a procedure followed by the respective components in the case of processing the received stream data and transmitting the processed stream data to the external portion.

The data reception module 121 receives the stream data transmitted from the data transmission client 190 via the network interface 113. In the same manner, the data reception module 151 receives the stream data transmitted from the data transmission client 190 via the network interface 143.

Upon reception of the stream data, the data reception module 121 and the data reception module 151 activate the main control module 123 and the main control module 153, respectively, in order to execute the query processing, and transmit the received stream data.

The main control module 123 activates the input data control module 124 because the stream processing module to which the main control module 123 belongs is of the active system. The input data control module 124 activates the query processing module 126 in order to execute the query processing. In addition, the input data control module 124 stores input data information in the tuple management table 125 based on the received stream data.

The main control module 123 activates the data transmission module 122 in order to transmit an output tuple to the data reception client 191, the output tuple being a result from the received stream data processed by the query processing module 126. Then, the main control module 123 transmits the output tuple to the data transmission module 122.

Upon reception of the output tuple, the data transmission module 122 transmits the output tuple to the data reception client 191 via the network interface 113. Each time the stream data is received from the data transmission client 190, the above-mentioned processing procedure is repeated to process the received stream data and transmit the processed stream data to the external portion.

Meanwhile, the main control module 153 activates the input stream saving/management module 157 and transmits the received data to the input stream saving/management module 157 because the stream processing module to which the main control module 153 belongs is of the standby system.

The input stream saving/management module 157 saves and manages the input stream data until a request to delete the input stream data is made by the memory copy control module 160.

The definition file analysis control module 129 reads the query definition file 116 and the query group definition file 117 stored in the hard disk drive 115 via the disk interface 114. Then, the definition file analysis control module 129 stores the definition information including a query execution sequence, a memory copy timing, a memory copy capacity, and a copy cycle in the copy capacity management table 128.

An order in which the queries are coupled (i.e., query execution sequence) is defined in the query definition file 116 in addition to specific contents of queries. Details thereof are described later by referring to FIG. 3.

Defined in the query group definition file 117 are: a memory copy time interval for a case of performing a memory copy on a time interval basis; a head query name of queries to be subjected to the memory copy; and a head query name of queries and the input number thereof for a case of performing a memory copy on a stream data input amount basis.

The head query specified from among the coupled queries and the subsequent coupled queries form the query group to be subjected to the memory copy. The query group is automatically created by the definition file analysis control module 129. Details of the query group are described later by referring to FIG. 4.

The memory copy control module 130 causes the memory transmission/reception control module 131 to transmit predetermined information via the network interface 113 to the memory transmission/reception control module 161 of the computer 140 of the standby system at the memory copy time intervals set in the copy capacity management table 128.

It should be noted that the memory copy time interval is set in the copy capacity management table 128 by the definition file analysis control module 129. Further, the predetermined information includes the stream data included in the query group, the stream data retained in the data transmission module 122 which has not been transmitted to the data reception client 191 yet, and the latest tuple information recorded in the tuple management table 125 which has already been input to each query.

The memory transmission/reception control module 161 stores the received data items in the corresponding components within the memory 142. For example, the stream data under the query processing is stored in the query processing module 156 for the corresponding query. Similarly, the latest tuple information which has already been input to each query is stored in the tuple management table 155 corresponding to each query. Further, the untransmitted stream data is stored in the data transmission module 152.

Further, in a case where the input amount of the stream data is defined by the query group definition file 117, the input data control module 124 corresponding to each query activates the memory copy control module 130 when the amount of the input stream data reaches the defined data amount. The memory copy control module 130 further causes the memory transmission/reception control module 131 to transmit predetermined data via the network interface 113 to the memory transmission/reception control module 161 of the standby system. As described above, the predetermined data includes the stream data included in the queries of the query group as a subject, the latest tuple information included in the tuple management table 125 which has already been input to each query, and the untransmitted stream data retained in the data transmission module 122.

In order to notify the standby system that the active system is in operation, the heartbeat transmission/reception module 132 transmits a heartbeat at predetermined intervals via the network interface 113 to the heartbeat transmission/reception module 162 of the standby system. The predetermined interval is, for example, 1 second.

Figure 2:
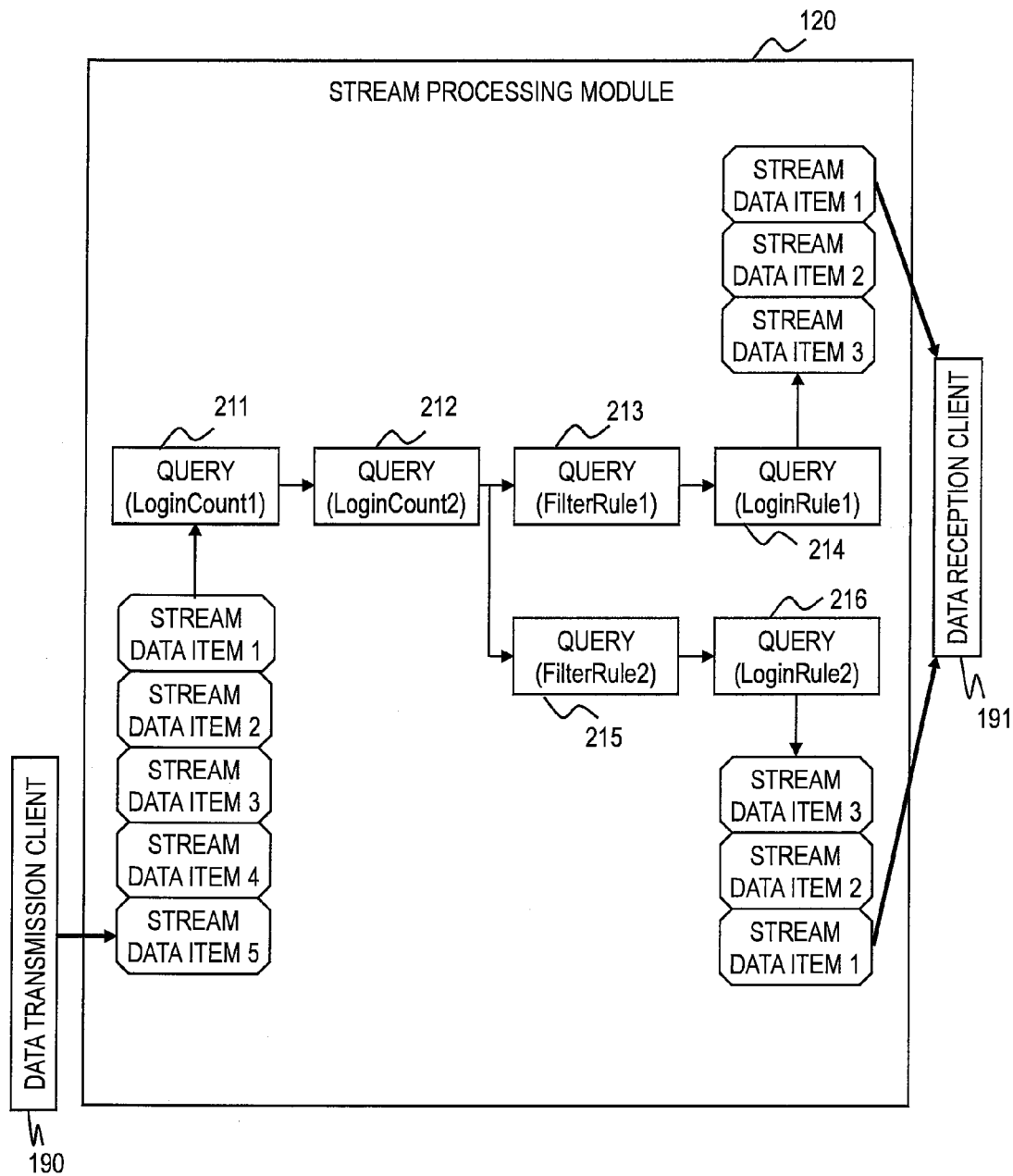
FIG. 2 is a diagram illustrating an example of a stream processing module for inputting login information for the computer system and discriminating between a normal login and an abnormal login according to the embodiment of this invention.

FIG. 2 is a diagram illustrating an example of the stream processing module 120 for inputting login information for the computer system and discriminating between a normal login and an abnormal login according to the embodiment of this invention.

The stream processing module 120 receives an input of login data of each host from the data transmission client 190, detects the login information for the normal login or the abnormal login, and transmits a detection results to the data reception client 191. The stream processing module 120 executes a processing for detecting so-called "spoofing".

First described is relationships between the respective queries included in the stream processing module 120.

Six queries 211 to 216 are coupled to the stream processing module 120. The query 211 takes data transmitted from the data transmission client 190 as input data thereto. The query 212 takes output data from the query 211 as input data thereto. The output data from the query 212 becomes the input data to the query 213 and the input data to the query 215. The output data from the query 213 becomes the input data to the query 214, and the output data from the query 215 becomes the input data to the query 216. Finally, the output data from the query 214 and the output data from the query 216 are transmitted to the data reception client 191 as processing results from the stream processing module 120.

Next described are contents of the processings performed by the respective queries included in the stream processing module 120.

The query 211 performs filtering so as to prevent detection of multiple logins from the same host for one minute. Specifically, the query 211 has a RangeWindow of one minute, and outputs data excluding information related to the same user who has logged in from the same host for one minute.

The query 212 sums up a login count for one minute on a user basis. Specifically, the query 212 has a RangeWindow of one minute, takes login data output from the query 211 as the input data thereto, and outputs data on summation data of login counts on a user basis.

The query 213 detects the user whose login count from different hosts for one minute is 2 or more. Specifically, the query 213 takes the user-basis summation data output from the query 212 as the input data thereto, filters out the user whose login count is 2 or more, and outputs summation data with the user being set as an abnormal user. In other words, it is detected that the same user has logged in to the computer system from different hosts.

The query 214 appends host information and login time to the user detected by the query 213, and transmits an output stream to the data reception client 191. In other words, the query 214 appends information including the host information and the login time to the data detected as the abnormal user, and transmits the output stream to the data reception client 191.

The query 215 detects the user whose login count from different hosts for one minute is less than 2. In other words, the query 215 receives an input of the user-basis summation data output from the query 212, filters out the user whose login count is less than 2, and detects a normal user.

The query 216 appends host information and login time to the user detected by the query 215, and transmits an output stream to the data reception client 191. In other words, the query 216 appends information including the host information and the login time to the data detected as the normal user, and transmits the output stream to the data reception client 191.

FIG. 3 is a diagram illustrating an example of a definition of queries executed by the stream processing module 120 according to the embodiment of this invention.

A query definition 300 illustrated in FIG. 3 is an example of the information recorded in the query definition file 116. Hereinafter, specific contents thereof are described.

The definition item "register stream" represents an instruction to register a stream. Further, the definition item "register query" represents an instruction to register a query. An operand following "register stream" indicates a stream name, and an operand following "register query" indicates a query name.

In addition, an operand following "FROM" indicates which query is succeeded by the query being registered. The operand following "FROM" specifying the stream name indicates that the query being registered is the head query. The operand following "FROM" specifying the query name indicates that this query is succeeded by the query being registered.

Therefore, in the query definition 300, the stream name is "AccessLog_Squid", and the query name of the head query is "LoginCount1". It is also indicated that the queries succeeding "LoginCount1" are the queries with the query name "LoginCount2", the query name "FilterRule1", and the query name "LoginRule1" in order.

Further, the query definition 300 indicates that the query with the query name "LoginCount2" is succeeded by the queries with the query name "FilterRule2" and the query name "LoginRule2".

Figures 4, 5:
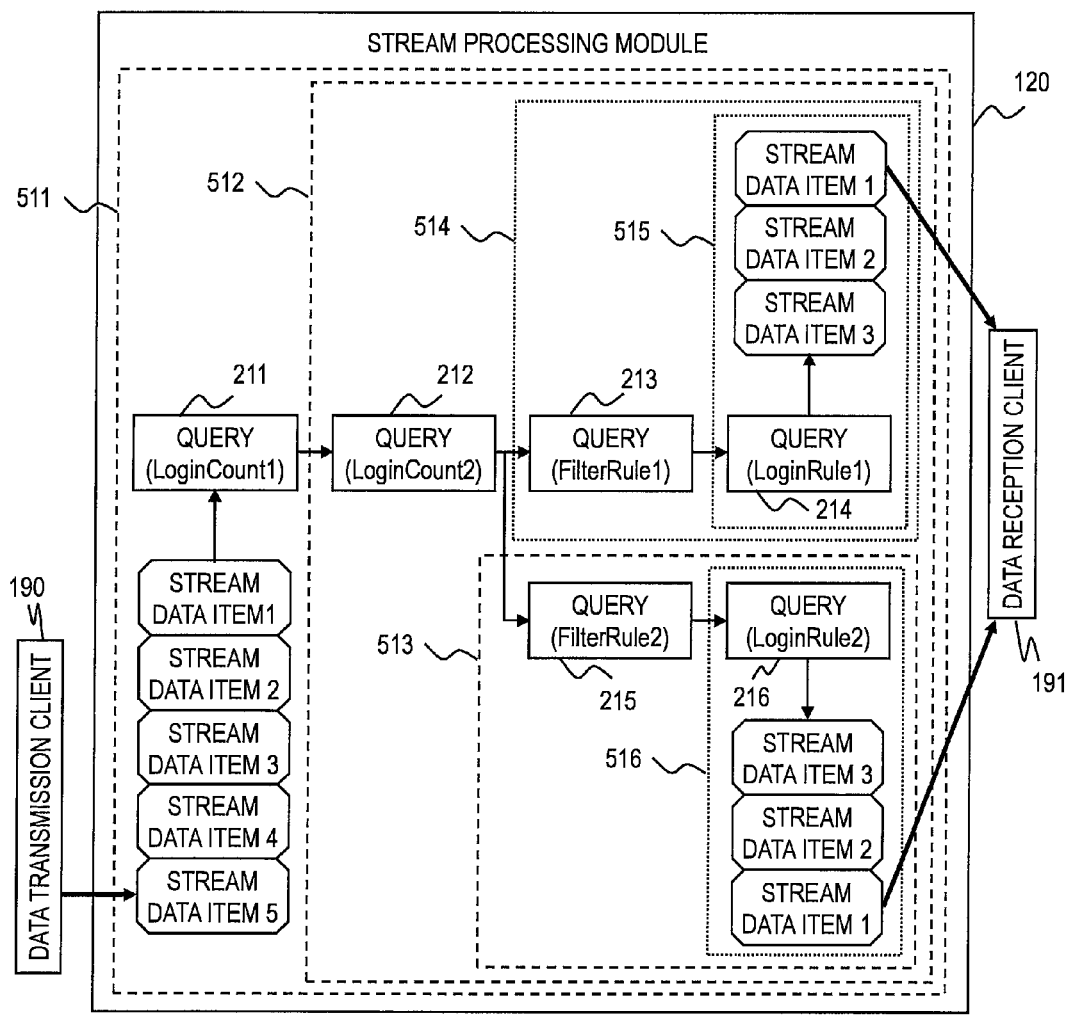
FIG. 4 is a diagram illustrating an example of query group definition according to the embodiment of this invention.
FIG. 5 is a diagram illustrating a group of queries to be subjected to memory copy in a case where the query group definition is applied to the stream processing module according to the embodiment of this invention.

FIG. 4 is a diagram illustrating an example of the query group definition 400 according to the embodiment of this invention.

The definition item "input_data_number" described in the query group definition 400 represents an instruction to perform the memory copy based on the input amount (number of items) of the stream data.

For specific description thereof, the definition "input_data_number=LoginCount1, 100" represents an instruction to perform the memory copy in a case where 100 items of data have been input to the query with the query name "LoginCount1". The queries to be subjected to the memory copy instructed by the definition item are the query with the query name "LoginCount1" and the succeeding queries to be executed subsequently thereto.

Further, the definition "input_data_number= LoginCount2, 50" represents an instruction to perform the memory copy in a case where 50 items of data have been input to the query with the query name "LoginCount2". The queries to be subjected to the memory copy instructed by the definition item are the query with the query name "LoginCount2" and the succeeding queries to be executed subsequently thereto.

The definition item "query_group" represents an instruction to perform the memory copy on a time interval basis. For specific description thereof, the definition "query_group= LoginCount1" is an instruction to perform the memory copy for the query with the query name "LoginCount1" and the succeeding queries to be executed subsequently thereto. The definition "query_group=LoginCount2" represents an instruction to perform the memory copy for the query with the query name "LoginCount2" and the succeeding queries to be executed subsequently thereto. The definition "query_group=FilterRule2" represents an instruction to perform the memory copy for the query with the query name "FilterRule2" and the succeeding queries to be executed subsequently thereto.

The definition item "memory_copy_interval" specifies the time interval for performing the memory copy. The definition "memory_copy_interval=10" represents an instruction to perform the memory copy at intervals of 10 seconds.

FIG. 5 is a diagram illustrating a group of queries to be subjected to the memory copy in a case where the query group definition 400 is applied to the stream processing module 120 according to the embodiment of this invention.

The query group to be subjected to the memory copy by the definition "input_data_number=LoginCount1, 100" is a query group 511 including the query 211 and the subsequent queries, in other words, the query 211, the query 212, the query 213, the query 214, the query 215, and the query 216. In the same manner, the query group to be subjected to the memory copy by the definition "input_data_number= LoginCount2, 50" is a query group 512 including the query 212 and the subsequent queries, in other words, the query 212, the query 213, the query 214, the query 215, and the query 216.

The query group to be subjected to the memory copy by the definition "query_group=LoginCount1" is the query group 511 including the query with the query name "LoginCount1", which is set as the head query within the stream, and all of the subsequent queries.

The query group to be subjected to the memory copy by the definition "query_group=LoginCount2" is the query group 512 to which the query 212 and the subsequent queries, in other words, the query 212, the query 213, the query 214, the query 215, and the query 216 are subjected.

The query group to be subjected to the memory copy by the definition "query_group=FilterRule2" is the query group 513 to which the query 215 and the subsequent queries, in other words, the query 215 and the query 216 are subjected.

In the case where the query group definition 400 is applied, in the stream processing module 120, a copy cycle of query groups is automatically decided based on the head query names of the respective query groups. With the head query of the query group 511 being "LoginCount1", the head query of the query group 512 being "LoginCount2", and the head query of the query group 513 being "FilterRule2", the copy cycle is the query group 511, the query group 512, and the query group 513 in the stated order from the query execution sequence.

The query group definition 400 includes the description "memory_copy_interval=10", and hence the memory copy is executed at intervals of 10 seconds in the order of the query group 511, the query group 512, and the query group 513. The memory copy is repeated in order until the end of the stream processing system.

Further, asynchronously with the memory copy on a time interval basis, the memory copy is performed for the query groups 511 and 512 that have reached the number of the input data items.

It should be noted that the definition of "input_data_number" is not essential, and the definition can be omitted if the memory copy based on the number of input data items is not necessary. In this case, the memory copy based on the number of input data items is not performed.

Further, the definition of "query_group" is also not essential, and if omitted, the definition file analysis control module 129 automatically decides the query group. In the case of the stream processing module 120, the query groups 511, 512, 513, 514, 515, and 516 are automatically created. However, in a case of defining "query_group", the head query within the stream must be necessarily defined.

The definition item "memory_copy_interval" can be omitted if a value specified when the setting for the value is omitted is preset.

Figure 6:
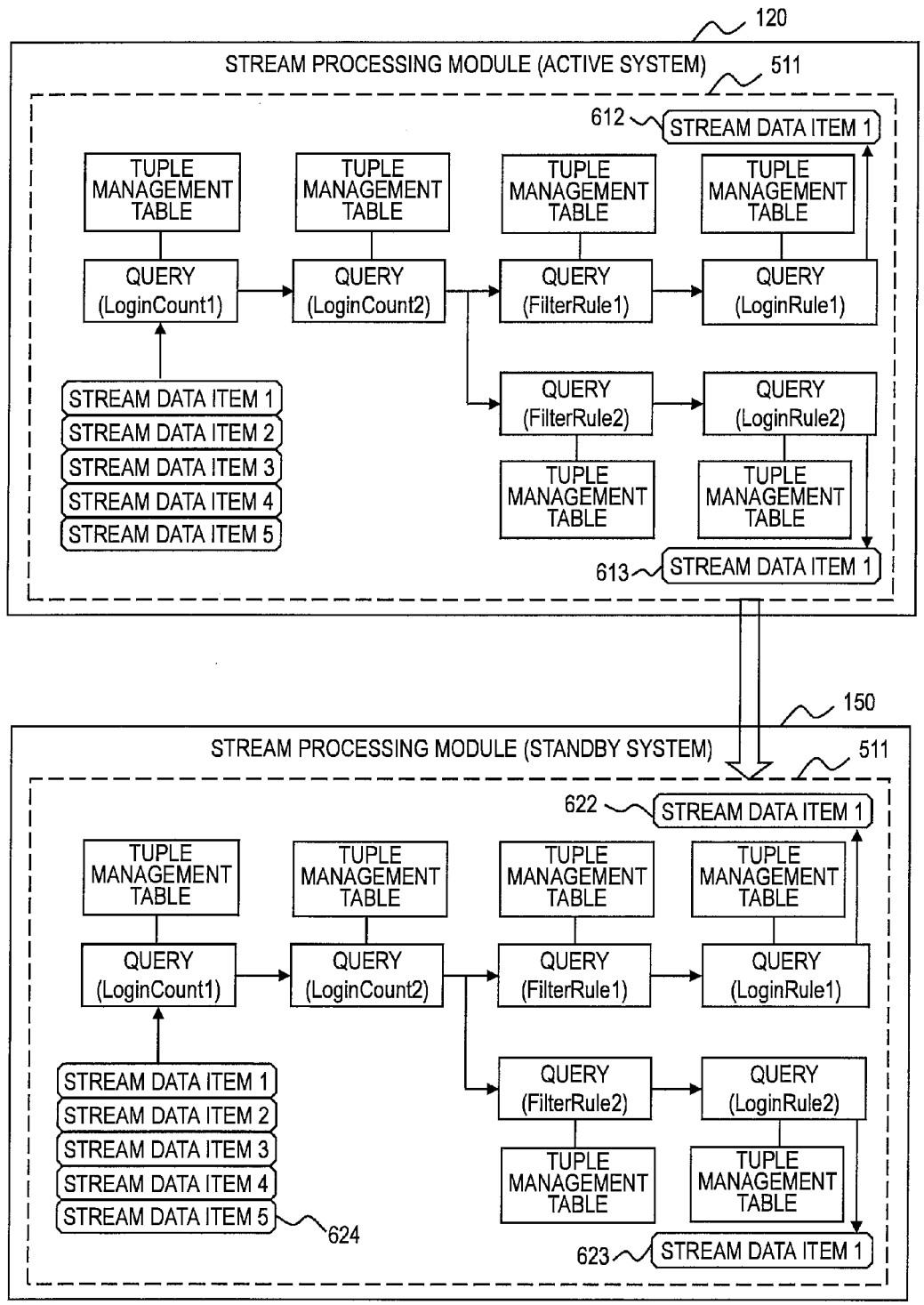
FIG. 6 is a diagram for illustrating a procedure for performing the memory copy for the query group from the stream processing module of an active system to the stream processing module of a standby system according to the embodiment of this invention.
Figure 7:
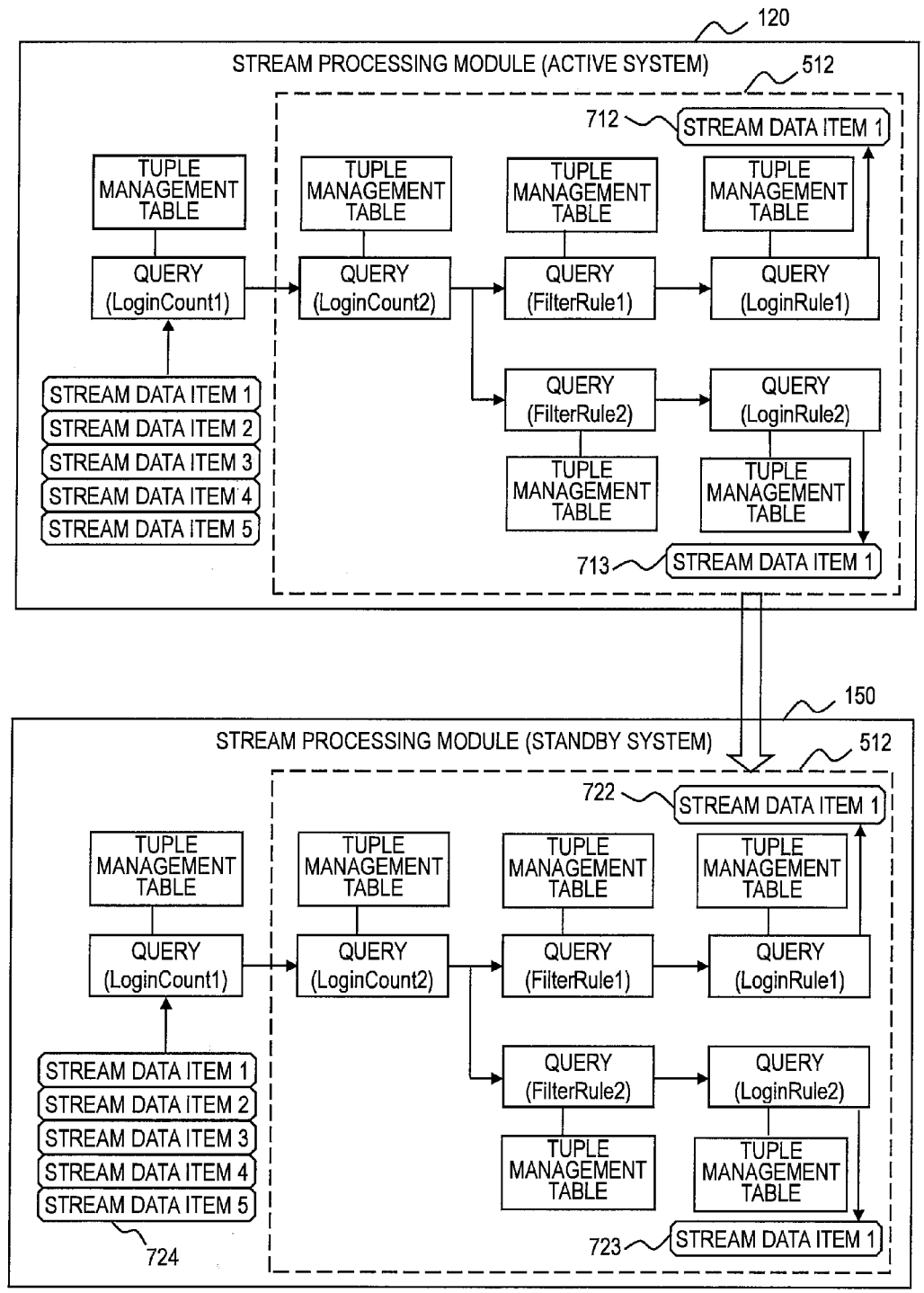
FIG. 7 is a diagram for illustrating a procedure for performing the memory copy for the query group from the stream processing module of the active system to the stream processing module of the standby system according to the embodiment of this invention.
Figure 8:
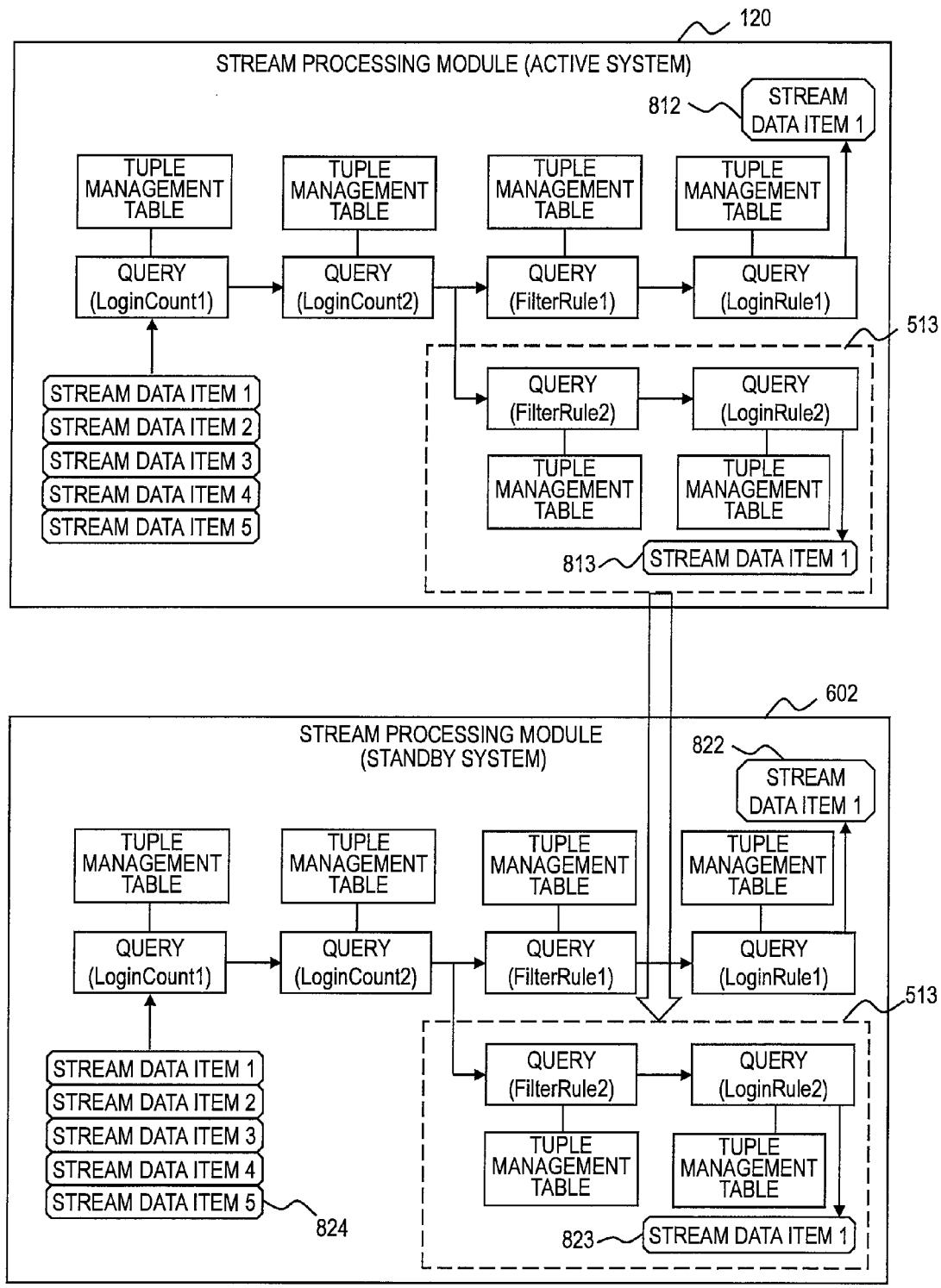
FIG. 8 is a diagram for illustrating a procedure for performing the memory copy for the query group from the stream processing module of the active system to the stream processing module of the standby system according to the embodiment of this invention.

FIG. 6, FIG. 7, and FIG. 8 are diagrams for illustrating a processing of performing the memory copy from the stream processing module 120 of the active system to the stream processing module 150 of the standby system.

Based on the definition items "input_data_number" and "query_group" described in the query group definition 400 illustrated in FIG. 4, the query groups 511, 512, and 513 illustrated in FIG. 5 are created.

The stream processing module 120 of the active system performs the memory copy at intervals of 10 seconds, which is defined by the definition item "memory_copy_interval", on a query group basis of the query groups 511, 512, and 513. It should be noted that a method of deciding the order in which the query groups are subjected to the copy is described later by referring to FIG. 9.

FIG. 6 is a diagram for illustrating a procedure for performing the memory copy for the query group 511 from the stream processing module 120 of the active system to the stream processing module 150 of the standby system according to the embodiment of this invention.

When the stream processing system is started, the stream processing module 120 acquires data related to the queries included in the query group 511 subjected to the first copy from the memory 112, and copies the data to the stream processing module 150 of the standby system. The specific data to be copied includes: input data management information recorded in the tuple management tables 125 corresponding to the respective queries included in the query group 511; the stream data within the queries; and transmission-standby stream data items 612 and 613.

The stream processing module 150 of the standby system updates the input data management information recorded in the tuple management table 155 based on the data received from the stream processing module 120 of the active system, and updates the stream data within the queries. In addition, the stream processing module 150 copies the transmission-standby stream data items 612 and 613 as transmission-standby stream data items 622 and 623 of the stream processing module 150 of the standby system.

Further, in the case where the query group 511 is a memory copy subject, a memory status within the stream processing module 150 becomes the same as a memory status within the stream processing module 120, which makes it unnecessary to recover the data within the queries. Therefore, all of the input stream data items 624 in the standby system are deleted. Accordingly, it is possible to reduce a use amount of the memory 142 of the standby system.

FIG. 7 is a diagram for illustrating a procedure for performing the memory copy for the query group 512 from the stream processing module 120 of the active system to the stream processing module 150 of the standby system according to the embodiment of this invention.

The stream processing module 120 sets the query group 512 as the memory copy subject subsequent to the query group 511. The stream processing module 120 acquires data related to the queries included in the query group 512 from the memory 112, and copies the data to the stream processing module 150 of the standby system. Specifically, the data to be copied includes: the input data management information recorded in the tuple management tables 125 corresponding to the respective queries included in the query group 512; the stream data within the queries; and transmission-standby stream data items 712 and 713.

The stream processing module 150 of the standby system updates the input data management information recorded in the tuple management table 155 based on the data received from the stream processing module 120 of the active system, and updates the stream data within the queries. In addition, the stream processing module 150 copies the transmission-standby stream data items 712 and 713 as transmission-standby stream data items 722 and 723 of the stream processing module 150 of the standby system.

Further, in the case where the memory copy subject is the query group 512, the memory status within the stream processing module 150 does not become entirely the same as the memory status within the stream processing module 120, which makes it necessary to recover the data within the queries by executing the queries. Therefore, the input stream data 724 in the standby system is retained as it is without being deleted.

FIG. 8 is a diagram for illustrating a procedure for performing the memory copy for the query group 513 from the stream processing module 120 of the active system to the stream processing module 150 of the standby system according to the embodiment of this invention.

The stream processing module 120 sets the query group 513 as the memory copy subject subsequent to the query group 512. The stream processing module 120 acquires data related to the queries included in the query group 513 from the memory 112, and copies the data to the stream processing module 150 of the standby system. Specifically, the data to be copied includes: the input data management information recorded in the tuple management tables 125 corresponding to the respective queries included in the query group 513; the stream data within the queries; and transmission-standby stream data items 812 and 813.

The stream processing module 150 of the standby system updates the input data management information recorded in the tuple management table 155 based on the data received from the stream processing module 120 of the active system, and updates the stream data within the queries. In addition, the stream processing module 150 copies the transmission-standby stream data items 812 and 813 as transmission-standby stream data items 822 and 823 of the stream processing module 150 of the standby system.

Further, in the case where the memory copy subject is the query group 513, the memory status within the stream processing module 150 does not become entirely the same as the memory status within the stream processing module 120, which makes it necessary to recover the data retained within the queries by executing the queries. Therefore, the input stream data 824 in the standby system is retained as it is without being deleted.

When the memory copy for the query group 513 is finished, the stream processing module 120 of the active system again performs the memory copy in order from the query group 511.

Further, in addition to the memory copy executed on a time interval basis, the memory copy is performed for the query groups 511 and 512 defined by the definition item "input_data_number" when the number of input items reaches 100 and 50, respectively. In the memory copy in this case, the input data management information corresponding to the respective queries, the stream data within the queries, and the transmission-standby stream data items are transmitted to the stream processing module 150 of the standby system. Then, the stream processing module 150 of the standby system that has received the data from the stream processing module 120 of the active system copies the received information to the memory 142. It should be noted that the query group specified by the definition item "input_data_number" is different only in copy timing, and is subjected to the same procedures for the memory transmission processing executed in the active system and the memory copy processing executed in the standby system.

Here, the query group definition is set as "query_group=LoginCount2" because the query processing for the query 212 (LoginCount2) includes the query for summing up the login count for one minute on a user basis and outputs the summation results to each of the query 213 and the query 215, in other words, because the subject is the query for providing the input data to a plurality of queries.

The query group definition is set as "query_group=FilterRule2" because the exemplified stream processing detects the abnormal user and the normal user, and because it is assumed that the amount for the normal user detected by the query 215 is larger than the amount for the abnormal user detected by the query 213. Therefore, the reason is that in a case of performing a recovery processing by the stream processing module 150 of the standby system, the more often the memory copy is performed for the query 215 and the subsequent queries, the less often the query processing for the query 215 and the subsequent queries can be executed upon recovery, which allows reduction in time required for the recovery.

The values "LoginCount1" and "LoginCount2" are specified for the definition item "input_data_number" because a RangeWindow is specified for the query 211 and the query 212. The RangeWindow retains the number of data items per unit of time, which makes it impossible to predict the number of tuples which must be retained, and hence a large amount of data must be retained if a large amount of stream data is input. Therefore, by performing not only the memory copy on a time interval basis but also the memory copy based on the number of input data items, data that is not retained in the standby system is prevented from being retained in the active system in large amount. It should be noted that if the amount of the stream data input per unit of time is small, the definition of "input_data_number" is not necessary.

Figure 9:
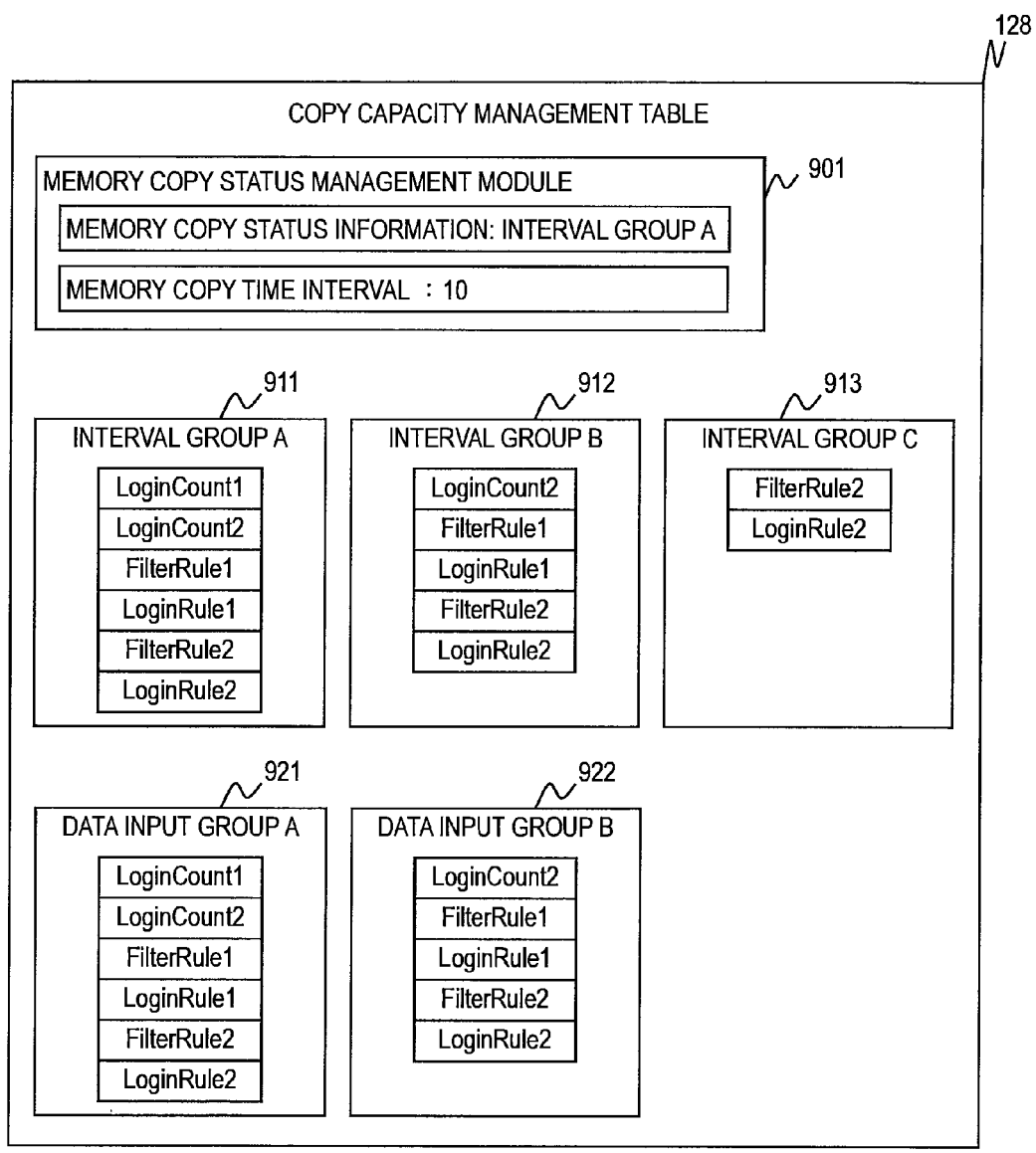
FIG. 9 is a diagram illustrating an example of a copy capacity management table according to the embodiment of this invention.

FIG. 9 is a diagram illustrating an example of the copy capacity management table 128 according to the embodiment of this invention.

The copy capacity management table 128 illustrated in FIG. 9 is created by the definition file analysis control module 129 analyzing the query definition illustrated in FIG. 3 and the query group definition 400 illustrated in FIG. 4 upon the startup of the stream processing system.

The copy capacity management table 128 includes a memory copy status management module 901 including the subject of the executed memory copy and the definition information on the group that is the unit based on which the memory copy is executed.

The memory copy status management module 901 manages the query group for which the memory copy has been executed. Recorded in the memory copy status management module 901 are, for example, memory copy status information that is identification information of the group for which the memory copy has been executed and the memory copy time interval that is an interval at which the memory copy is executed.

The memory copy status information is the identification information of the group for which the memory copy has been executed as described above, and is dynamic information that varies at time intervals set by the definition item "memory_copy_interval". Based on the information stored in the memory copy status information, it is possible to identify the query group to be executed next. It should be noted that the memory copy status information may store therein the query group to be executed next instead of the group for which the memory copy has been executed. The memory copy time interval stores the value set by the definition item "memory_copy_interval".

In addition, the group that is the unit based on which the memory copy is executed includes interval group and data input group. The interval group manages the copy cycle of the query groups created based on the information defined by the definition item "query_group". The data input group manages the query group created based on the information defined by the definition item "input_data_number". The interval group and the data input group are static information whose values do not change after having been created upon the startup of a stream data processing system.

Here, description is made of the interval group and the data input group created specifically based on the query definition 300 and the query group definition 400.

As the interval groups, an interval group A 911, an interval group B 912, and an interval group C 913 are created based on the information defined by the definition item "query_group" of the query group definition 400. Therefore, one of the interval group A 911, the interval group B 912, and the interval group C 913 is recorded in the memory copy status information of the copy capacity management table 128.

The interval group A 911 is query group information created based on the definition "query_group=LoginCount1". The interval group A 911 is the query group including the query "LoginCount1", which is set as the head query, and all of the subsequent queries. The data retained by the query that is not included in the query group is restored by applying the query to the input stream data. Accordingly, by defining the query group so as to include the head query thereof and all of the subsequent queries, it is possible to judge whether or not the input stream data needs to be processed with the head query of the query group as a boundary.

In the same manner, the interval group B 912 is query group information created based on the definition "query_group=LoginCount2", and the interval group C 913 is query group information created based on the definition "query_group=FilterRule2".

Further, the query group (interval group) may be created by setting each query included in the query definition file 116 as the head query irrespective of the query group definition file 117. This makes it possible to automate the creation of the query group.

The copy cycle of the query groups is decided based on the head queries of the respective query groups. With the head query of the interval group A 911 being "LoginCount1", the head query of the interval group B 912 being "LoginCount2", the head query of the interval group C 913 being "FilterRule2", the processing is performed for "LoginCount1", "LoginCount2", and "FilterRule2" in the stated order. The order of the stream processing is positioned at memory copy priorities, and therefore the copy cycle of the query groups is set to be the interval group A 911, the interval group B 912, and the interval group C 913. Further, as illustrated in FIG. 5, the query 213 and the query 215 have the same priority level when judged based on the order of the stream processing, but in this case, the priorities are decided based on the order in which the queries are defined.

It should be noted that the copy cycle of the query groups does not necessarily follow the order of the stream processing. For example, the execution for the respective query groups may be carried out on the basis of time intervals independent of each other. In this case, in order to suppress an increase in the load on the computers, attention should be paid so that the copy for a plurality of query groups may not be executed simultaneously.

Further, the copy for the query group (for example, interval group A 911) having a large amount of data to be transferred may be executed in a case where the load on the network is light, and the copy for the query group (for example, interval group C 913) having a small amount of data to be transferred may be executed in a case where the load on the network is heavy.

As the data input groups, data input group A 921 and data input group B 922 are created based on the information defined by the definition item "input_data_number" of the query group definition 400.

The data input group A 921 retains the query group information created based on the definition "input_data_number=LoginCount1, 100". The data input group B 922 retains the query group information created based on the definition "input_data_number=LoginCount2, 50".

Figure 10:
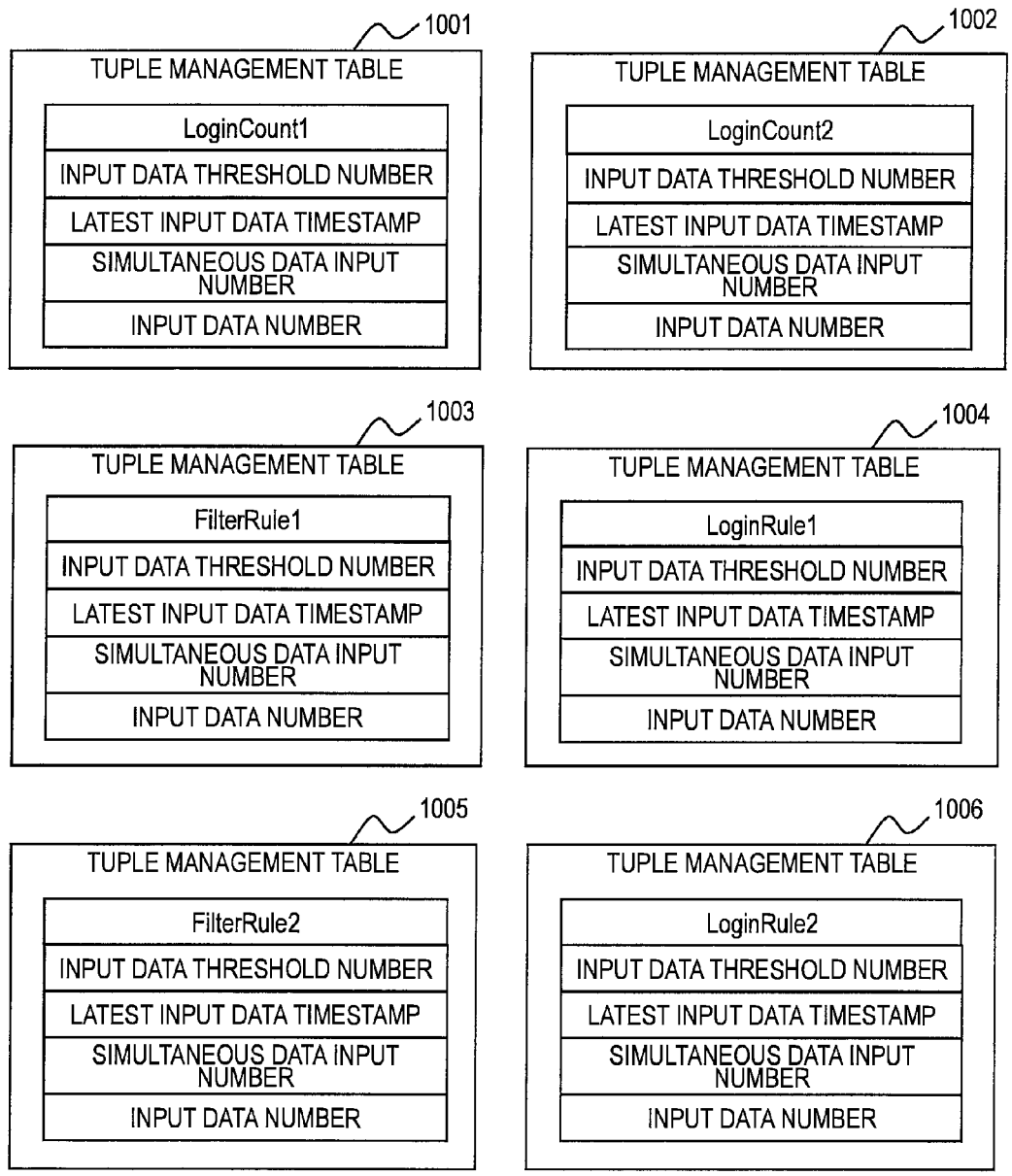
FIG. 10 is a diagram illustrating an example of a tuple management table according to the embodiment of this invention.

FIG. 10 is a diagram illustrating an example of the tuple management table 125 according to the embodiment of this invention.

The tuple management table 125 is created based on a query structure on a query basis after the copy capacity management table 128 has been created by the definition file analysis control module 129 upon the startup of the stream processing system.

The tuple management table 125 includes the query name, an input data threshold number, a latest input data timestamp, a simultaneous data input number, and an input data number.

The query name represents a name for identifying a defined query. The input data threshold number represents the number of the input data items to be a threshold for executing the memory copy in the case where the query group definition 400 includes the definition of "input_data_number". The query name and the input data threshold number are static information set upon the startup of the stream processing system after which values thereof are not changed.

The latest input data timestamp represents a timestamp at which the latest stream data is input to the above-mentioned query. The simultaneous data input number represents the input number of the stream data items that are being input to the above-mentioned query in question at the latest input data timestamp. The input data number is formed of dynamic information on the number of input data items to be subjected to the execution of the memory copy by the definition of "input_data_number", representing the number of the input data items to be the memory copy subject in the case where the item "input_data_number" is defined.

FIG. 10 illustrates a specific example of the tuple management table 125 based on the query definition 300 and the query group definition 400.

A tuple management table 1001 retains input tuple information related to the query name. "LoginCount1". In the same manner, a tuple management table 1002 retains input tuple information related to the query name "LoginCount2", a tuple management table 1003 retains input tuple information related to the query name "FilterRule1", a tuple management table 1004 retains input tuple information related to the query name "LoginRule1", a tuple management table 1005 retains input tuple information related to the query name "FilterRule2", and a tuple management table 1006 retains input tuple information related to the query name "LoginRule2".

The latest input data timestamp, the simultaneous data input number, and the input data number are dynamic information updated when the data is input to the query.

Figure 11:
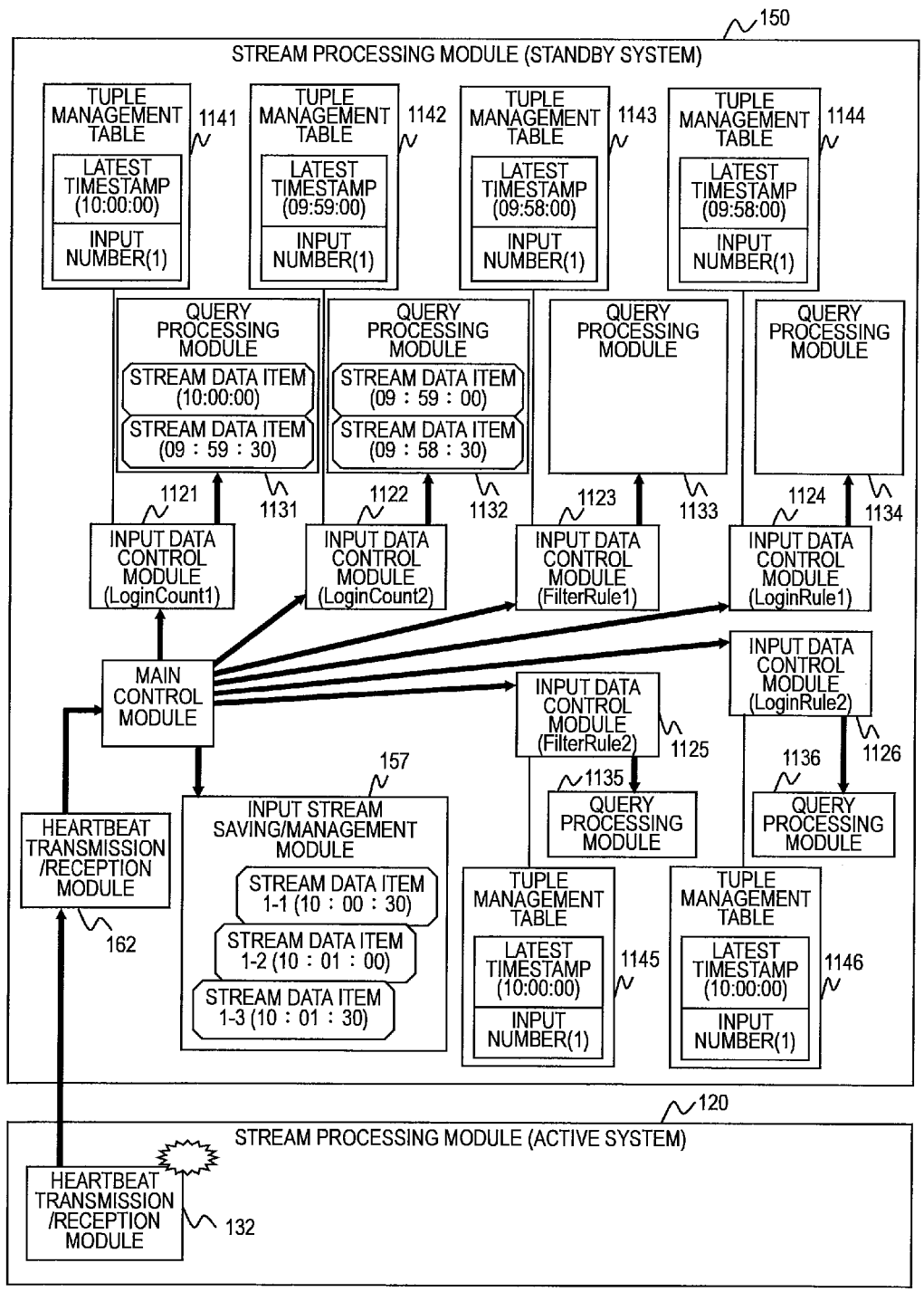
FIG. 11 is a diagram illustrating a procedure for switching to the computer of the standby system when a failure occurs on the computer of the active system according to the embodiment of this invention.

FIG. 11 is a diagram illustrating the procedure for switching the processing to the computer 140 of the standby system when a failure occurs on the computer 110 of the active system according to the embodiment of this invention.

FIG. 11 illustrates a state in which the memory copy corresponding to the query group 513 illustrated in FIG. 8 is executed, and a tuple management table 1145 and a tuple management table 1146 corresponding to the query group 513 in the standby system are the most updated information.

The heartbeat transmission/reception module 132 included in the stream processing module 120 of the active system transmits the heartbeat at intervals of one second to thereby notify the heartbeat transmission/reception module 162 of the stream processing module 150 of the standby system that the stream processing module 120 is in operation. The heartbeat represents a signal transmitted for notifying the external portion that the stream processing module 120 of the active system is in a normal operation.

Upon reception of the heartbeat, the heartbeat transmission/reception module 162 recognizes that the stream processing module 120 of the active system is in operation. In consideration of a delay in transmission of the heartbeat from the stream processing module 120 of the active system, the heartbeat transmission/reception module 162 waits for the reception of the heartbeat for two seconds maximum. If the heartbeat transmitted by the stream processing module 120 of the active system cannot be received after wailing for two seconds, the heartbeat transmission/reception module 162 recognizes that a failure has occurred in the stream processing module 120 of the active system.

When recognizing that a failure has occurred in the stream processing module 120 of the active system, the heartbeat transmission/reception module 162 activates the main control module 153 in order to start the recovery processing in the stream processing module 150. In order to start the recovery processing for the stream processing system, the main control module 153 first activates the input stream saving/management module 157. The input stream saving/management module 157 transmits an earliest stream data item 1-1 to the main control module 153.

The main control module 153 activates an input data control module 1121 corresponding to the query for processing the input data first. In addition, the main control module 153 transmits the received stream data item 1-1 to the activated input data control module 1121.

The input data control module 1121 compares the latest timestamp (latest input data timestamp) existing in a tuple management table 1141 with the timestamp of the stream data item 1-1, and activates a query processing module 1131 if the timestamp of the stream data item 1-1 is later than the latest timestamp.

The query processing module 1131 executes the query processing to process the stream data item 1-1 and outputs a result tuple. At this time, the result tuple is transmitted to the main control module 153 with the timestamp set to the earliest timestamp (09:59:30) within the query processing module 1131. Here, the tuple of the latest timestamp retained in the query processing module 1131 becomes the tuple of the timestamp "10:00:30", while the latest timestamp in the tuple management table 1141 is changed to "10:00:30", and the data input number of the same timestamp is changed to "1".

In this case, the RangeWindow of the corresponding query is one minute, and hence the tuple of the timestamp "09:59:30" retained in the query processing module 1131 is discarded, and the tuples of the timestamps "10:00:00" and "10:00:30" are retained in the query processing module 1131.

The main control module 153 activates an input data control module 1122, and transmits the processing result (09:59:30) of the query processing module 1131 to the activated input data control module 1122. The input data control module 1122 compares the latest timestamp (09:59:00) existing in a tuple management table 1142 with the timestamp (09:59:30) of the input data, and activates a query processing module 1132 if the timestamp of the input data is later than the latest timestamp.

The query processing module 1132 executes the query processing, and outputs the result tuple. In addition, the earliest timestamp (09:58:30) retained in the query processing module 1132 is set to the output result tuple, and the output result tuple is transmitted to the main control module 153.

Here, the tuple of the latest timestamp retained in the query processing module 1132 becomes the tuple of the timestamp "09:59:30", while the latest timestamp in the tuple management table 1142 is changed to "09:59:30", and the data input number of the same timestamp is changed to "1".

In this case, the RangeWindow of the corresponding query is one minute, and hence the tuple of the timestamp "09:58:30" retained in the query processing module 1132 is discarded, and the tuples of the timestamps "09:59:00" and "09:59:30" are retained in the query processing module 1132.

Further, the main control module 153 activates an input data control module 1123, and transmits the processing result (09:58:30) of the query processing module 1132 to the activated input data control module 1123. The input data control module 1123 compares the latest timestamp (09:58:00) existing in a tuple management table 1143 with the timestamp (09:58:30) of the input tuple, and activates a query processing module 1133 if the timestamp set for the input tuple is later than the latest timestamp.

The query processing module 1133 executes the query processing, and outputs the tuple if the input tuple is data on the abnormal user.

Because no Window is defined in the query processing module 1133, the input data timestamp (09:58:30) is set as the output tuple as it is, and the output tuple is transmitted to the main control module 153. Then, the latest timestamp in the tuple management table 1142 is changed to "09:58:30", and the input number of the same timestamp is changed to "1".

Further, the main control module 153 activates an input data control module 1124, and transmits the processing result (09:58:30) of the query processing module 1133 to the activated input data control module 1124. The input data control module 1124 compares the latest timestamp (09:58:00) existing in a tuple management table 1144 with the timestamp (09:58:30) of the input tuple, and activates a query processing module 1134 if the timestamp set for the input tuple is later than the latest timestamp.

The query processing module 1134 executes the query processing, and appends the host information and the login time to the input tuple. Because no Window is defined in the query processing module 1134, the input data timestamp (09:58:30) is set as the output tuple as it is, and the output tuple is transmitted to the main control module 153. Then, the latest timestamp in the tuple management table 1142 is changed to "09:58:30", and the input number of the same timestamp is changed to "1". The output tuple output from the query processing module 1134 is transmitted to the data reception client 191 because no query to be processed subsequently is defined.

Subsequently, the main control module 153 activates an input data control module 1125, and transmits the processing result (09:58:30) of the query processing module 1132 to the activated input data control module 1125. The input data control module 1125 compares the latest timestamp (10:00:00) existing in the tuple management table 1145 with the timestamp (09:58:30) of the input tuple, and discards the input tuple because the latest timestamp is later than the timestamp set for the input tuple.

Subsequently, the processing for a stream data item 1-2 retained in the input stream saving/management module 157 is started in the same manner as the case of the stream data item 1-1. If the stream data item 1-2 is normal data, the input tuple is discarded from the query processing module 1133 without having the result tuple output therefrom. In addition, in the query processing module 1135, the latest timestamp is later than the timestamp set for the input tuple, and hence the input tuple is discarded. The processing is performed for a stream data item 1-3 in the same manner.

The main control module 153 attempts to cause the input stream saving/management module 157 to perform an input of the next stream data item after completion of the processing for the stream data item 1-3. However, the processing for all of the stream data items saved in the input stream saving/management module 157 has been completed, and hence the input stream saving/management module 157 notifies the main control module 153 that there exists no data to be processed.

When notified by the input stream saving/management module 157 that there exists no data to be processed, the main control module 153 terminates the recovery processing for the stream data. From that time onward, the stream processing module 150 continues the stream processing as an executing system in place of the stream processing module 120 in which the failure has occurred.

Hereinafter, processing procedures for the stream data processing system according to the embodiment of this invention is described by referring to flowcharts. Each of processings described below is executed by the processor 111 of the computer 110 of the active system or the processor 141 of the computer 140 of the standby system executing the programs included in the stream processing module 120 or the stream processing module 150, respectively. Therefore, a main body that executes the processings illustrated in the following flowcharts is the processor 111 or the processor 141, but for easy understanding, the description is made by assuming that the main body is a processing module (program) executed by the processor for executing the processing.

Further, each of the computers functions both as the active system and the standby system, and hence the flowchart corresponding to each processing module illustrates both the processing executed in the active system and the processing executed in the standby system. Unless otherwise specified, an operating main body of each processing corresponding to the flowchart is each of the processing modules included in the active system.

Figure 12:
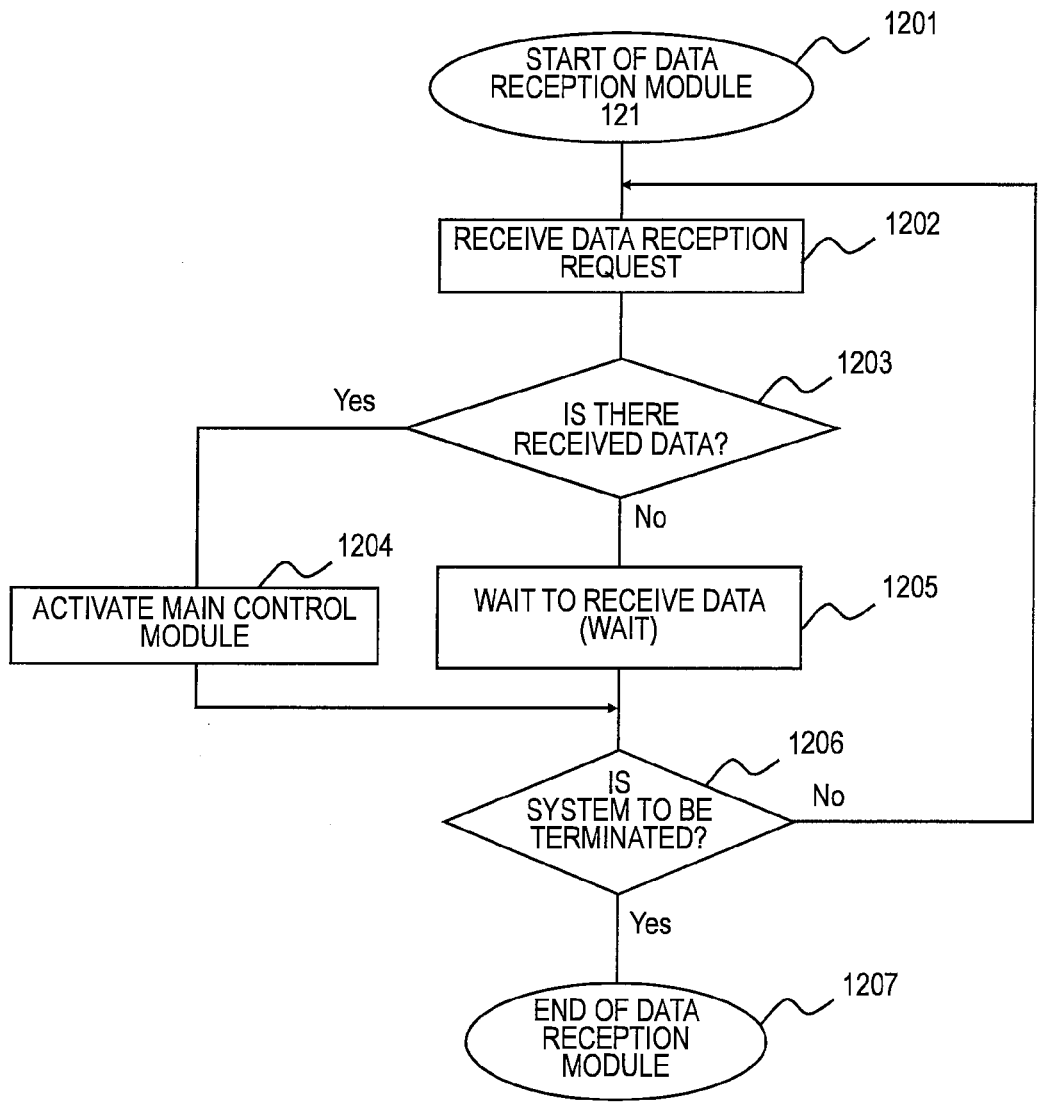
FIG. 12 is a flowchart illustrating a procedure for a processing executed by a data reception module according to the embodiment of this invention.

FIG. 12 is a flowchart illustrating the procedure for the processing executed by the data reception module 121 according to the embodiment of this invention. This processing is executed on the computers of the active system and the standby system, and the same holds true for a case of being executed on the computer 140 of the standby system.

When the stream processing system is started, the data reception module 121 and the data reception module 151 are executed on the computer 110 of the active system and the computer 140 of the standby system, respectively, and the reception of the stream data is started (Step 1201).

The data reception module 121 receives a reception request for stream data via the network interface 113 (Step 1202). In addition, the data reception module 121 judges whether or not the stream data has been received (Step 1203). If the stream data cannot be received ("No" as a result of Step 1203), the data reception module 121 shifts to a WAIT status until a predetermined condition is satisfied (Step 1205).

If the stream data is received ("Yes" as a result of Step 1203), the data reception module 121 activates the main control module 123 to process the received stream data (Step 1204).

The data reception module 121 has the WAIT status cleared if the data transmitted from the data transmission client 190 is received and the reception of the data is notified by the network interface 113 or if a termination request for the stream processing system is received.

If the WAIT status is cleared, the data reception module 121 judges whether or not the WAIT status has been cleared in response to the termination request for the stream processing system (Step 1206). In other words, the data reception module 121 judges whether the WAIT status has been cleared in response to the reception of the data or whether the WAIT status has been cleared in response to the termination request for the stream processing system.

If the WAIT status has been cleared in response to the reception of the data ("No" as a result of Step 1206), the data reception module 121 receives the reception request for the data (Step 1202). On the other hand, if the WAIT status has been cleared in response to the termination request for the stream processing system ("Yes" as a result of Step 1206), the processing by the data reception module 121 is terminated (Step 1207).

Figure 13:
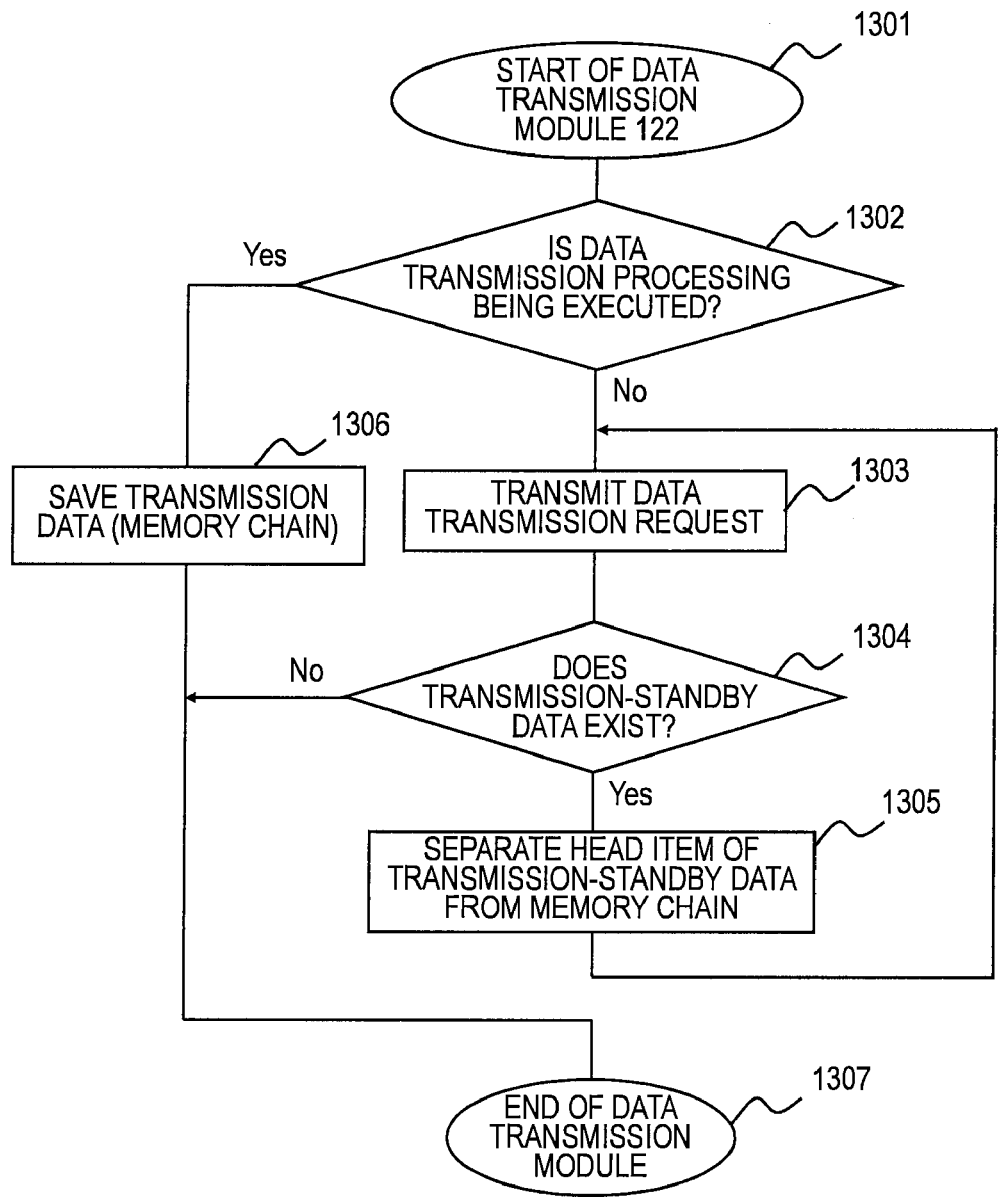
FIG. 13 is a flowchart illustrating a procedure for the processing executed by a data transmission module according to the embodiment of this invention.

FIG. 13 is a flowchart illustrating the procedure for the processing executed by the data transmission module 122 according to the embodiment of this invention.

The data transmission module 122 is activated when the main control module 123 issues a data transmission request, and starts to transmit data processed by the query processing module 126 (Step 1301).

First, the data transmission module 122 judges whether or not a transmission processing for the data is being executed (Step 1302). If the transmission processing is not being executed ("No" as a result of Step 1302), the data transmission module 122 transmits the data transmission request to the network interface 113 (Step 1303), and transmits the data to the data reception client 191.

After transmitting the data transmission request, the data transmission module 122 judges whether or not there exists transmission-standby data (Step 1304). If there exists the transmission-standby data ("Yes" as a result of Step 1304), the data transmission module 122 separates the head data item from a memory chain (Step 1305), and again transmits the data transmission request to the network interface 113 (Step 1303). The memory chain represents a data structure for retaining untransmitted data by coupling items thereof in a transmission-order list manner. After that, the data transmission module 122 transmits the data in order from the head item of the memory chain, and when there is no transmission-standby data, the processing by the data transmission module 122 is terminated (Step 1307).

If the transmission processing for the data is being executed ("Yes" as a result of Step 1302), the data transmission module 122 saves the transmission data at the tail of the memory chain (Step 1306), and the processing by the data transmission module 122 is terminated (Step 1307).

Figure 14:
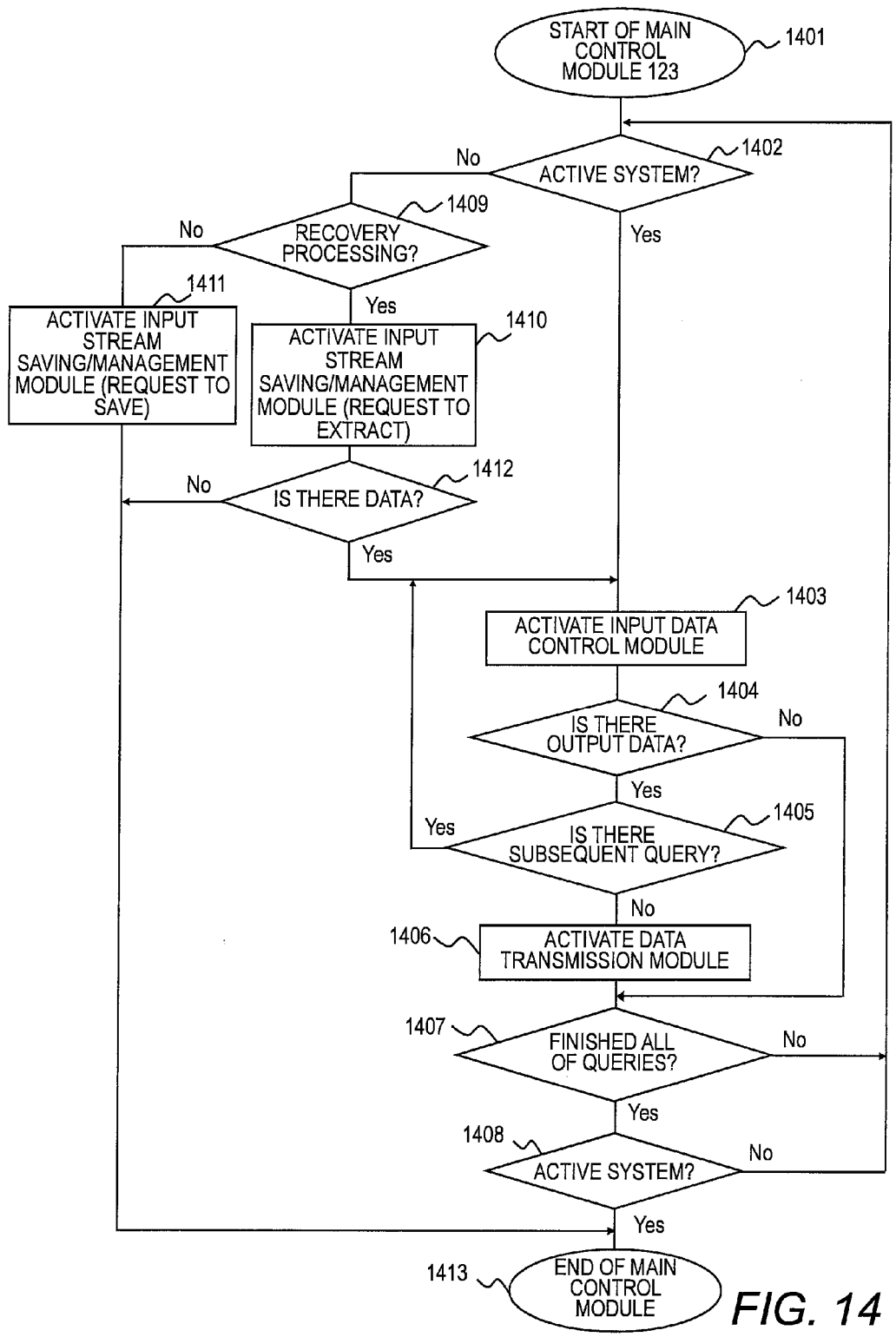
FIG. 14 is a flowchart illustrating a procedure for the processing executed by a main control module according to the embodiment of this invention.

FIG. 14 is a flowchart illustrating the procedure for the processing executed by the main control module 123 according to the embodiment of this invention.

The main control module 123 or the main control module 153 is activated if the stream data is received or if a failure occurs in the active system and the recovery processing is executed in the standby system (Step 1401).

The main control module 123 or the main control module 153 judges whether or not the own stream processing module is of the active system (Step 1402). If the own stream processing module is of the active system ("Yes" as a result of Step 1402), the main control module 123 recognizes that this processing has been started in response to the reception of the stream data, and activates the input data control module 124 based on the query definition (Step 1403).

If the processing by the input data control module 124 is finished, the main control module 123 judges whether or not there exists output data (Step 1404). If there exists output data ("Yes" as a result of Step 1404), the main control module 123 judges whether or not the subsequent query exists based on the query definition (Step 1405). If the subsequent query exists ("Yes" as a result of Step 1405), the main control module 123 keeps executing the input data control module 124 until all of the defined queries have been processed (Step 1403).

If no subsequent query exists ("No" as a result of Step 1405), and if there exists output data ("Yes" as a result of Step 1404), the main control module 123 activates the data transmission module 122, and transmits the output data (Step 1406).

If the transmission of the output data is completed, or if no subsequent query exists ("No" as a result of Step 1405) and if there exists no output data ("No" as a result of Step 1404), the main control module 123 judges whether or not there exists another query to be processed, in other words, whether or not all of the defined queries have been processed (Step 1407). If not all of the defined queries have been processed, in other words, if there remains an unprocessed query ("No" as a result of Step 1407), the main control module 123 processes the remaining query.

If all of the queries have been processed ("Yes" as a result of Step 1407), the main control module 123 judges whether or not the own stream processing module is of the active system (Step 1408). If the own stream processing module is of the active system ("Yes" as a result of Step 1408), the processing by the main control module 123 is terminated (Step 1413).

If the own stream processing module is not of the active system, in other words, if the own stream processing module is of the standby system ("No" as a result of Step 1402), the main control module 153 judges whether or not the requested processing is the recovery processing (Step 1409).

If the recovery processing is requested ("Yes" as a result of Step 1409), the main control module 153 activates the input stream saving/management module 157, and requests to extract the saved stream data (Step 1410). In addition, the main control module 153 judges whether or not there exists input data (Step 1412). If there exists input data ("Yes" as a result of Step 1412), the main control module 153 activates the input data control module 154 based on the defined query (Step 1403), and processes the input data. If there exists no input data ("No" as a result of Step 1412), the processing by the main control module 153 is terminated (Step 1413).

Meanwhile, if the recovery processing is not requested ("No" as a result of Step 1409), the main control module 153 executes the input stream saving/management module 157, and requests to save the received stream data (Step 1411). After that, the processing by the main control module 153 is terminated (Step 1413).

Figure 15:
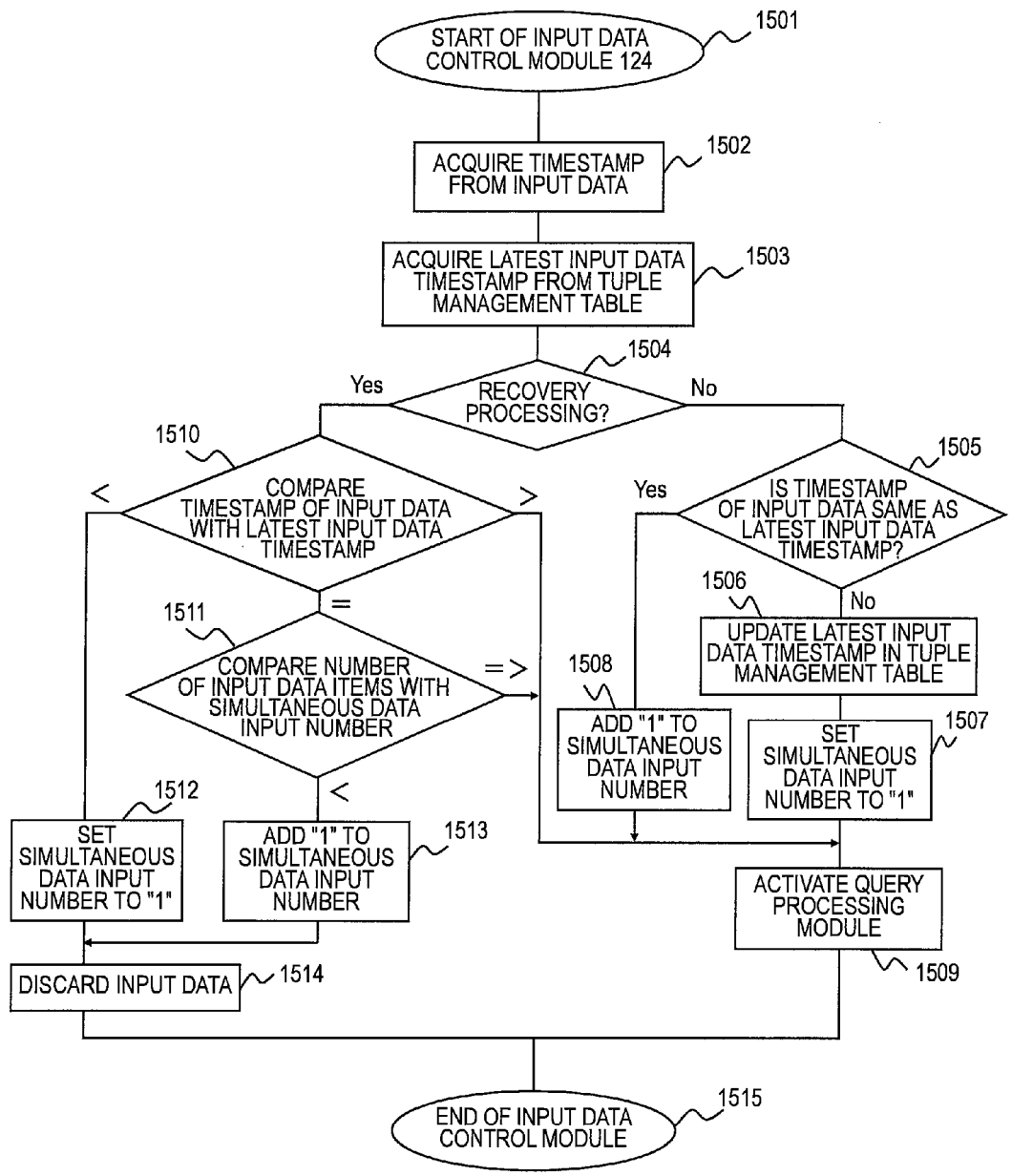
FIG. 15 is a flowchart illustrating a procedure for the processing executed by an input data control module according to the embodiment of this invention.

FIG. 15 is a flowchart illustrating the procedure for the processing executed by the input data control module 124 according to the embodiment of this invention.

This processing is executed in both the active system and the standby system, but the description is made by assuming that the input data control module 124 is the main body.

The input data control module 124 is activated by the main control module 123 (Step 1501). At this time, data is input by the main control module 123.

The input data control module 124 acquires the timestamp appended to the input data (Step 1502). In addition, the input data control module 124 acquires the latest input data timestamp from the tuple management table 125 (Step 1503). Subsequently, the input data control module 124 judges whether or not the own stream processing module is executing the recovery processing (Step 1504).

If the own stream processing module is not executing the recovery processing ("No" as a result of Step 1504), the input data control module 124 judges whether or not the timestamp appended to the input data is the same as the latest input data timestamp in the tuple management table 125 (Step 1505).

If the timestamp appended to the input data is the same as the latest input data timestamp in the tuple management table 125 ("Yes" as a result of Step 1505), the input data control module 124 updates the value of the simultaneous data input number in the tuple management table 125 to a value incremented by "1" (Step 1508).

Meanwhile, if the timestamp appended to the input data is different from the latest input data timestamp in the tuple management table 125 ("No" as a result of Step 1505), the input data control module 124 updates the latest input data timestamp in the tuple management table 125 (Step 1506). In addition, the input data control module 124 initializes the simultaneous data input number to "1", and updates the simultaneous data input number in the tuple management table 125 (Step 1507).

If updating of each field item of the tuple management table 125 is finished, the input data control module 124 activates the query processing module 126 (Step 1509), and processes the input data by the defined query. If the processing for the query is finished, the processing by the input data control module 124 is terminated (Step 1515).

If the own stream processing module is executing the recovery processing ("Yes" as a result of Step 1504), the input data control module 124 compares the timestamp appended to the input data with the latest input data timestamp in the tuple management table 125 (Step 1510).

If the timestamp appended to the input data is earlier than the latest input data timestamp in the tuple management table 125 (">" as a result of Step 1510), the input data control module 124 activates the query processing module 126 (Step 1509), and processes the input data by the defined query. If the processing for the query is finished, the processing by the input data control module 124 is terminated (Step 1515).

If the timestamp appended to the input data is later than the latest input data timestamp in the tuple management table 125 ("<" as a result of Step 1510), the input data control module 124 sets the simultaneous data input number in the tuple management table 125 to "1" (Step 1512). After that, the input data control module 124 discards the input data (Step 1514), and terminates the processing by the input data control module 124 (Step 1515).

If the timestamp appended to the input data is the same as the latest input data timestamp in the tuple management table 125 ("=" as a result of Step 1510), the input data control module 124 compares the number of input data items with the simultaneous data input number in the tuple management table 125 (Step 1511).

If the number of input data items is larger than or the same as the simultaneous data input number in the tuple management table 125 ("=>" as a result of Step 1511), the input data control module 124 processes the input data by the defined query. If the processing for the query is finished, the processing by the input data control module 124 is terminated (Step 1515).

If the number of input data items is smaller than the simultaneous data input number in the tuple management table 125 ("<" as a result of Step 1511), the input data control module 124 updates the value of the simultaneous data input number in the tuple management table 125 to a value incremented by "1" (Step 1513). After that, the input data control module 124 discards the input data (Step 1514), and the processing by the input data control module 124 is terminated (Step 1515).

Figure 16:
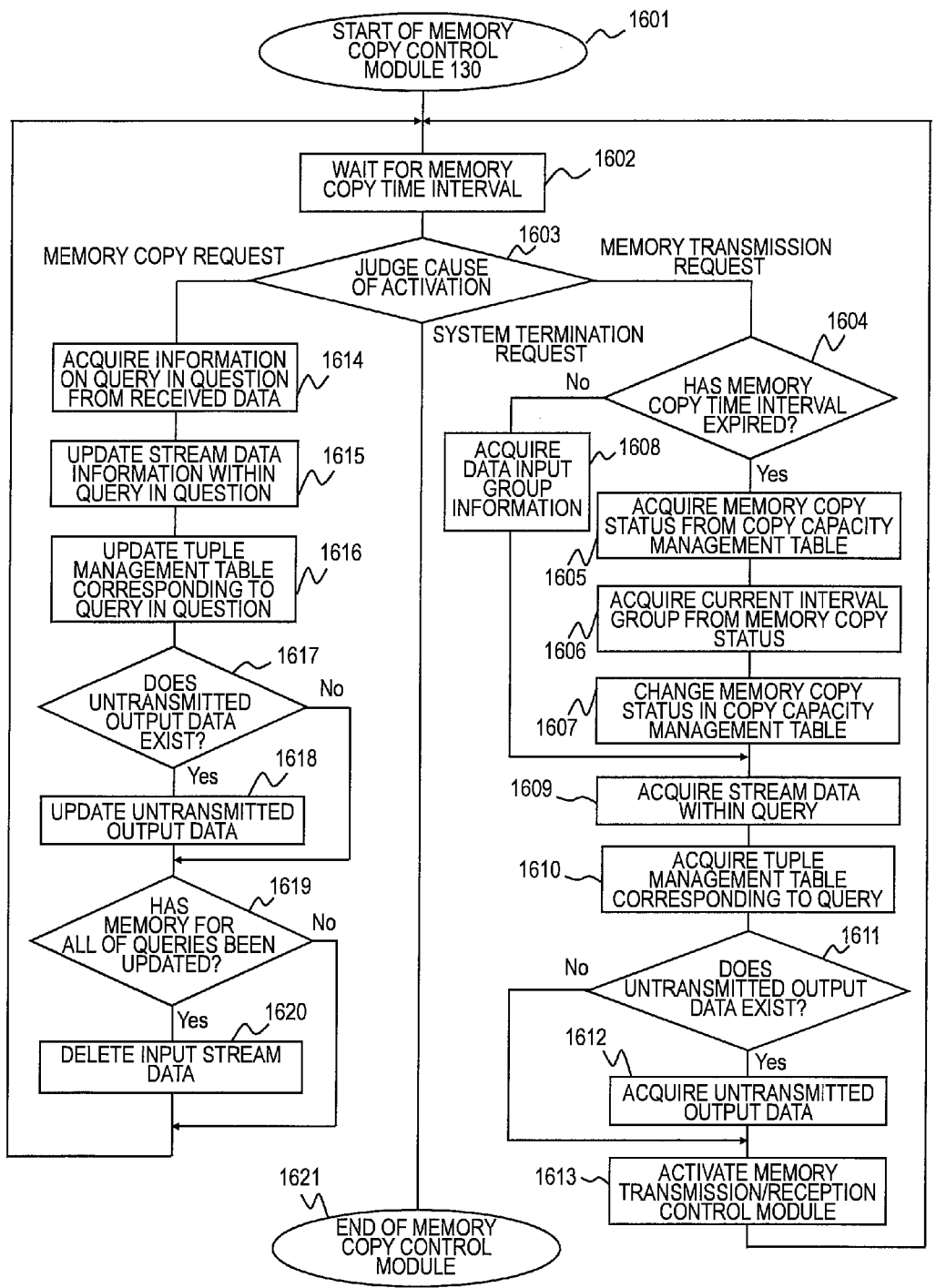
FIG. 16 is a flowchart illustrating a procedure for the processing executed by a memory copy control module according to the embodiment of this invention.

FIG. 16 is a flowchart illustrating the procedure for the processing executed by the memory copy control module 130 according to the embodiment of this invention.

The memory copy control module 130 is activated upon the start of the stream processing module 120 (Step 1601). After the activation, the active system waits for the defined memory copy time interval, and then shifts to the WAIT status (Step 1602). Meanwhile, the standby system waits until reception of the copy request for the contents of the memory transmitted by the active system (Step 1602).

The memory copy control module 130 of the active system has the WAIT status cleared in response to the expiration of a memory transmission time interval, the fulfillment of a predetermined data input amount, or a WAIT clearance request due to system termination. Further, the memory copy control module 160 of the standby system has the WAIT status cleared in response to the reception of a memory copy request or the WAIT clearance request due to the system termination.

First, the memory copy control module 130 judges which of a memory transmission request, a memory copy request, and a system termination request has caused the WAIT status to be cleared (Step 1603).

If the memory transmission request has caused the WAIT status to be cleared ("memory transmission request" as a result of Step 1603), the memory copy control module 130 further judges which of the memory copy time interval and the input data amount the memory transmission request is based on (Step 1604).

If the memory transmission request has been notified based on the memory copy time interval ("Yes" as a result of Step 1604), the memory copy control module 130 acquires the memory copy status information included in the copy capacity management table (Step 1605), and acquires the interval group to be the memory copy subject (Step 1606). After that, the memory copy control module 130 updates the memory copy status information to the next interval group (Step 1607).

If the memory transmission request has been notified based on the fulfillment of the input data amount with respect to the query ("No" as a result of Step 1604), the memory copy control module 130 acquires information on the data input group corresponding to the above-mentioned query (Step 1608).

After acquiring the information on the interval group or the data input group, the memory copy control module 130 acquires, from each of the information items, the stream data included in the query, in other words, the stream data retained in the query processing module 126 (Step 1609). In addition, the memory copy control module 130 acquires the latest input data timestamp and the input data number included in the tuple management table 125 corresponding to each query (Step 1610).

In addition, the memory copy control module 130 judges whether or not there exists output data that has not been transmitted to the data reception client 191 (Step 1611). If there exists untransmitted output data ("Yes" as a result of Step 1611), the memory copy control module 130 acquires the untransmitted output data retained in the data transmission module 122 (Step 1612). If the acquisition of the data to be transmitted to the standby system is completed, the memory copy control module 130 activates the memory transmission/reception control module 131 (Step 1613). If the processing by the memory transmission/reception control module 131 is terminated, the memory copy control module 130 shifts to the WAIT status again (Step 1602).

If the memory copy request has caused the WAIT status to be cleared ("memory copy request" as a result of Step 1603), the memory copy control module 160 first acquires information on the query in question from the received data (Step 1614). Then, the memory copy control module 160 updates the stream data retained in the query processing module 156 corresponding to the query in question (Step 1615), and further updates the tuple management table 155 corresponding to the query in question (Step 1616).

Further, the memory copy control module 160 judges whether or not there exists output data that has not been transmitted to the data reception client 191 (Step 1617). If there exists untransmitted output data ("Yes" as a result of Step 1617), the memory copy control module 160 acquires the untransmitted output data retained in the data transmission module 152 (Step 1618).

The memory copy control module 160 copies all of the received data items, and after all of the data items and information items are updated, judges whether or not the received data items are data items corresponding to all of the queries (Step 1619). If the received data items are the data items corresponding to all of the queries ("Yes" as a result of Step 1619), the memory copy control module 160 deletes the input stream data (Step 1620). After that, the memory copy control module 160 shifts to the WAIT status again (Step 1602).

If the system termination request has caused the WAIT status to be cleared ("system termination" as a result of Step 1603), the memory copy control module 130 terminates the processing by the memory copy control module 130 (Step 1621).

Figure 17:
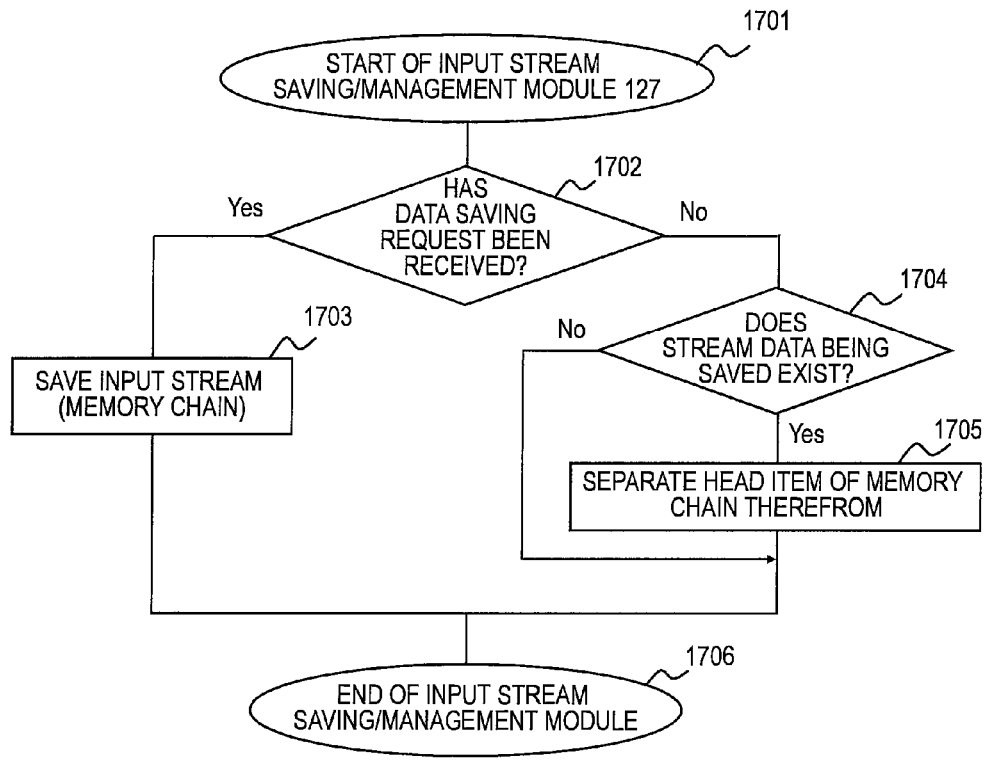
FIG. 17 is a flowchart illustrating a procedure for the processing executed by an input stream saving/management module according to the embodiment of this invention.

FIG. 17 is a flowchart illustrating the procedure for the processing executed by the input stream saving/management module 127 according to the embodiment of this invention.

The input stream saving/management module 127 is activated by the main control module 123 (Step 1701). After the activation, the input stream saving/management module 127 first receives a request from the main control module 123. Then, the input stream saving/management module 127 judges whether or not the received request is a data saving request (Step 1702).

If the data saving request has been received ("Yes" as a result of Step 1702), the input stream saving/management module 127 saves the input data to the input stream saving/management module 127 (Step 1703). The input data items are stored by the above-mentioned memory chain. After that, the processing by the input stream saving/management module 127 is terminated (Step 1706).

If the received request is a request other than the data saving request, in other words, a data extracting request ("No" as a result of Step 1702), the input stream saving/management module 127 judges whether or not there exists stream data being saved (Step 1704). If there exists no stream data being saved ("No" as a result of Step 1704), the processing by the input stream saving/management module 127 is terminated (Step 1706).

If there exists the stream data being saved ("Yes" as a result of Step 1704), the input stream saving/management module 127 separates the data item stored as the head item of the memory chain therefrom, and returns the separated data (Step 1705). After that, the processing by the input stream saving/management module 127 is terminated (Step 1706).

Figure 18:
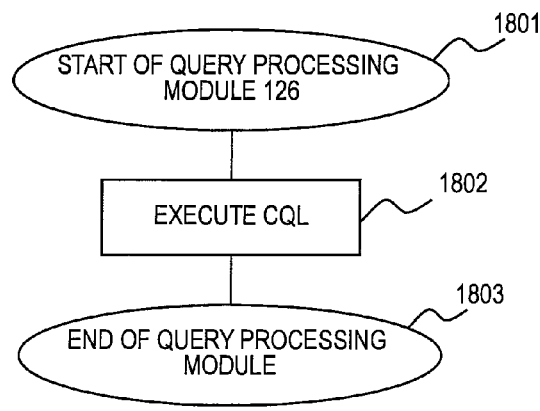
FIG. 18 is a flowchart illustrating a procedure for the processing executed by a query processing module according to the embodiment of this invention.

FIG. 18 is a flowchart illustrating the procedure for the processing executed by the query processing module 126 according to the embodiment of this invention.

The query processing module 126 is activated by the input data control module 124 (Step 1801). Then, the query processing module 126 executes CQL corresponding to the query processing module 126 based on the input data (Step 1802). Upon completion of the execution of CQL, the query processing module 126 terminates the processing by the query processing module 126 (Step 1803).

Figure 19:
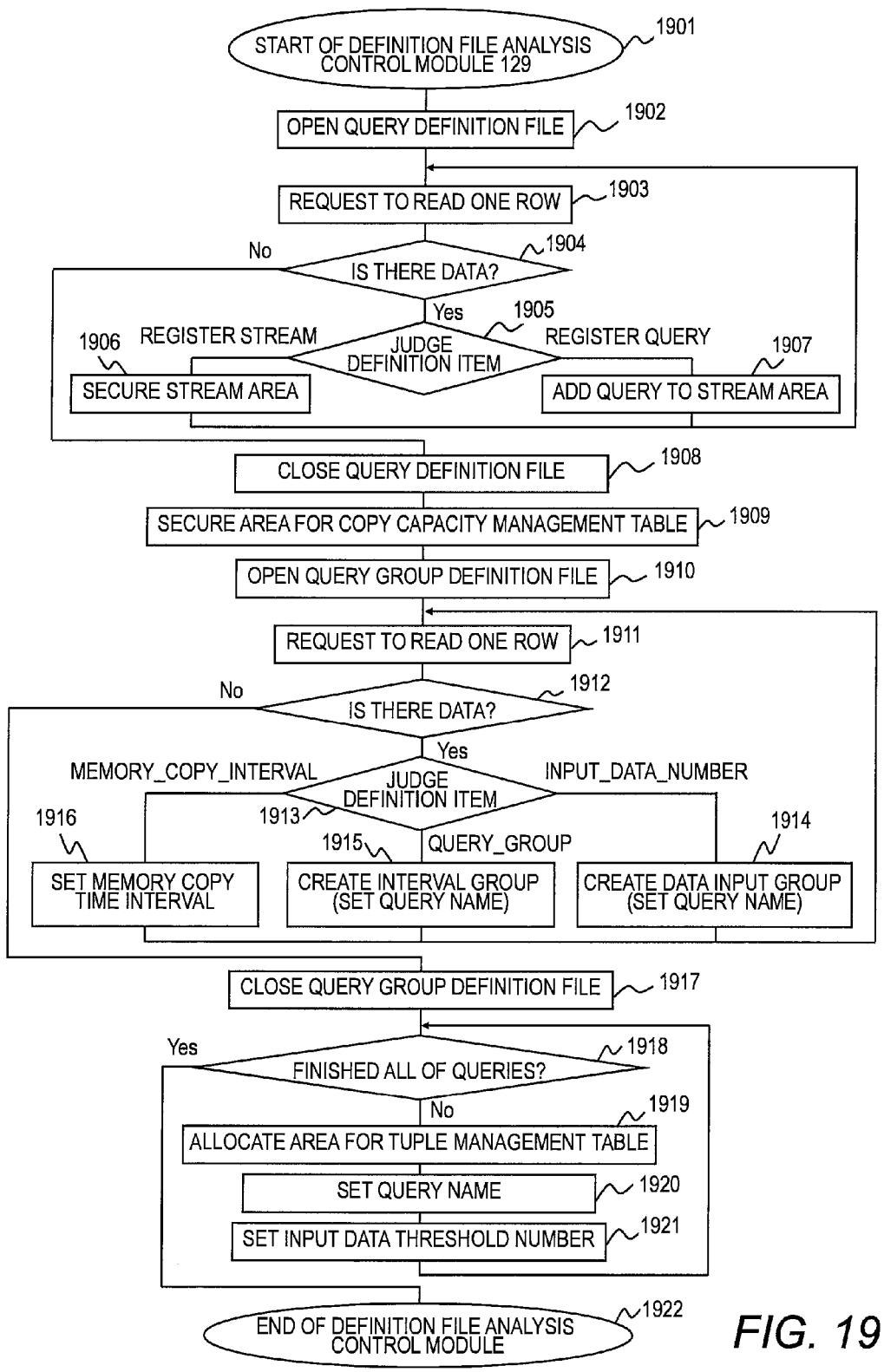
FIG. 19 is a flowchart illustrating a procedure for the processing executed by a definition file analysis control module according to the embodiment of this invention.

FIG. 19 is a flowchart illustrating the procedure for the processing executed by the definition file analysis control module 129 according to the embodiment of this invention.

The definition file analysis control module 129 is activated upon the start of the stream processing module 120 (Step 1901).

First, the definition file analysis control module 129 opens the query definition file 116 stored on the hard disk drive 115 via the disk interface 114 (Step 1902). In the same manner, the definition file analysis control module 129 requests to read the contents of the definitions in units of rows included in the query definition file 116 via the disk interface 114 (Step 1903).

The definition file analysis control module 129 judges whether or not the data has been acquired by reading the contents of the definitions in units of rows from the query definition file 116 (Step 1904). If the data has been acquired ("Yes" as a result of Step 1904), the definition file analysis control module 129 further judges the definition item (Step 1905).

If the definition item is "register stream" ("register stream" as a result of Step 1905), the definition file analysis control module 129 allocates a stream area for temporarily storing the query execution sequence to the memory 112 (Step 1906).

If the definition item is "register query" ("register query" as a result of Step 1905), the definition file analysis control module 129 stores the query names in the stream area allocated to the memory 112 in the query execution sequence (Step 1907).

The definition file analysis control module 129 executes the processings of Steps 1903 through 1907 for all of the rows defined in the query definition file 116, and decides the query execution sequence.

If all of the rows have been read and processed ("No" as a result of Step 1904), the definition file analysis control module 129 closes the query definition file 116 stored on the hard disk drive 115 via the disk interface 114 (Step 1908). In addition, the definition file analysis control module 129 allocates an area for creating the copy capacity management table 128 to the memory 112 (Step 1909).

After that, the definition file analysis control module 129 opens the query group definition file 117 stored on the hard disk drive 115 via the disk interface 114 (Step 1910). In the same manner, the definition file analysis control module 129 requests to read the contents of the definitions in units of rows via the disk interface 114 (Step 1911).

The definition file analysis control module 129 judges whether or not the data has been acquired by reading the contents of the definitions in units of rows from the query group definition file 117 (Step 1912). If the data has been acquired ("Yes" as a result of Step 1912), the definition file analysis control module 129 further judges the definition item (Step 1913).

If the definition item is "input_data_number" ("input_data_number" as a result of Step 1913), the definition file analysis control module 129 creates the data input group in the copy capacity management table 128, and sets the query name of the query in question (Step 1914).

If the definition item is "query_group" ("query_group" as a result of Step 1913), the definition file analysis control module 129 creates the interval group in the copy capacity management table 128, and sets the query name of the query in question (Step 1915).

If the definition item is "memory_copy_interval" ("memory_copy_interval" as a result of Step 1913), the definition file analysis control module 129 creates the interval group in the copy capacity management table 128, and sets the memory copy time interval (Step 1916).

If all of the rows in the query group definition file 117 have been processed ("No" as a result of Step 1912), the definition file analysis control module 129 closes the query group definition file 117 stored on the hard disk drive 115 via the disk interface 114 (Step 1917). After that, the definition file analysis control module 129 creates the tuple management table 125 for each query.

The definition file analysis control module 129 judges whether or not all of the tuple management tables 125 corresponding to the queries included in the stream area created in the processing of Step 1906 have been created (Step 1918).

If not all of the tuple management tables 125 have been created ("No" as a result of Step 1918), the definition file analysis control module 129 allocates an area for creating the tuple management table 125 to the memory 112 (Step 1919). In addition, the definition file analysis control module 129 creates the tuple management table 125 corresponding to the query for which the tuple management table 125 has not been created in the allocated area, and sets the query name of the corresponding query (Step 1920). In addition, the definition file analysis control module 129 sets the input data threshold number (Step 1921).

If the creation of the tuple management tables 125 for all of the queries is finished ("Yes" as a result of Step 1918), the definition file analysis control module 129 terminates the processing by the definition file analysis control module 129 (Step 1922).

Figure 20:
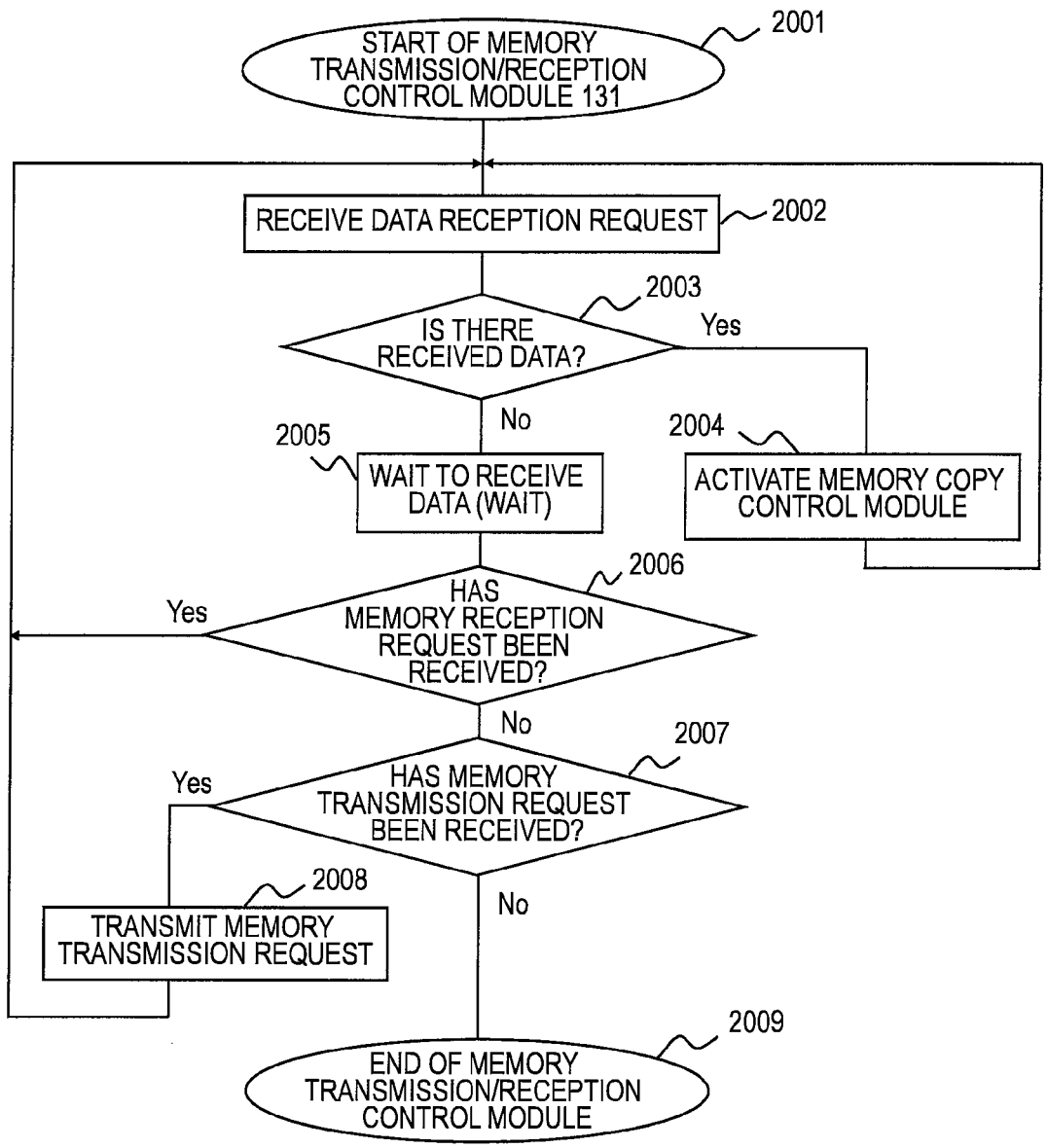
FIG. 20 is a flowchart illustrating a procedure for the processing executed by a memory transmission/reception control module according to the embodiment of this invention.

FIG. 20 is a flowchart illustrating the procedure for the processing executed by the memory transmission/reception control module 131 according to the embodiment of this invention.

The memory transmission/reception control module 131 is activated upon the start of the stream processing module 120 (Step 2001). The memory transmission/reception control module 131 receives a data reception request via the network interface 113 (Step 2002).

The memory transmission/reception control module 131 judges whether or not data has been received (Step 2003). If the data has been received ("Yes" as a result of Step 2003), the memory transmission/reception control module 131 activates the memory copy control module 130, and instructs the memory copy control module 130 to execute the memory copy (Step 2004).

If the data has not been received ("No" as a result of Step 2003), the memory transmission/reception control module 131 waits for the reception of the data, and shifts to the WAIT status (Step 2005). At this time, the memory transmission/reception control module 131 has the WAIT status cleared if notified that the data transmitted from the active system has been received via the network interface 113, if receiving the transmission request from the memory copy control module 130, or if receiving the WAIT clearance request due to the termination request from the stream processing module.

If the WAIT status is cleared, the memory transmission/reception control module 131 first judges whether or not a memory reception request has caused the WAIT status to be cleared (Step 2006). If the memory reception request has caused the WAIT status to be cleared ("Yes" as a result of Step 2006), the memory transmission/reception control module 131 receives the reception request for the data via the network interface 113 (Step 2002). After that, the memory transmission/reception control module 131 receives the data, and executes the memory copy control module 130 (Step 2004) to thereby execute the memory copy.

If the memory reception request has not caused the WAIT status to be cleared ("No" as a result of Step 2006), the memory transmission/reception control module 131 judges whether or not the memory transmission request has caused the WAIT status to be cleared (Step 2007). If the memory transmission request has caused the WAIT status to be cleared ("Yes" as a result of Step 2007), the memory transmission/reception control module 131 transmits the memory transmission request to the computer of the active system via the network interface 113 (Step 2008).

If the memory transmission request has not caused the WAIT status to be cleared ("No" as a result of Step 2007), the memory transmission/reception control module 131 has the WAIT status cleared in response to the termination request for the stream processing module, and hence terminates the processing by the memory transmission/reception control module 131 (Step 2009).

Figure 21:
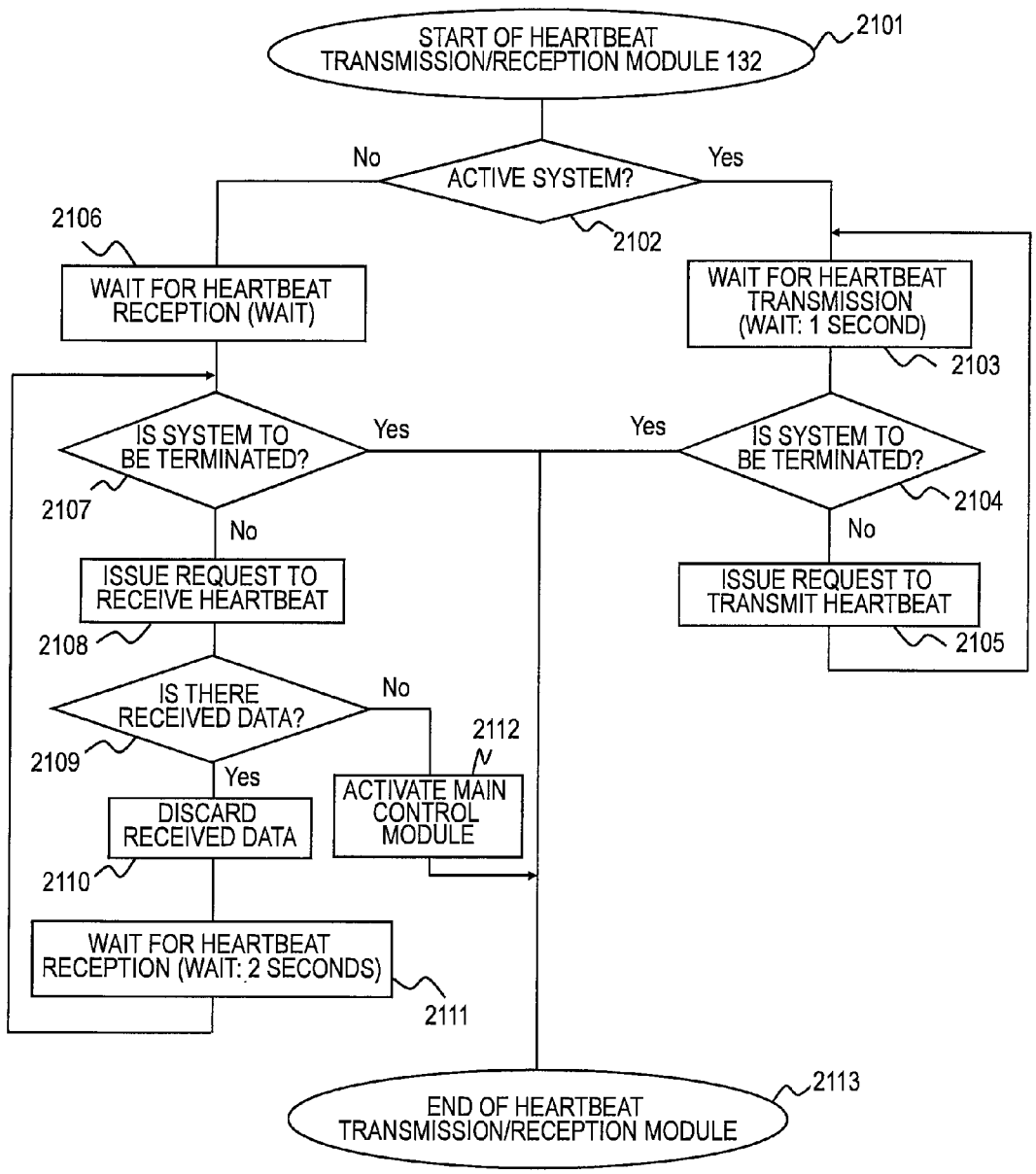
FIG. 21 a flowchart illustrating a procedure for the processing executed by a heartbeat transmission/reception module according to the embodiment of this invention.

FIG. 21 a flowchart illustrating the procedure for the processing executed by the heartbeat transmission/reception module 132 according to the embodiment of this invention.

The heartbeat transmission/reception module 132 is activated upon the start of the stream processing module 120 (Step 2101). First, the heartbeat transmission/reception module 132 judges whether or not the own stream processing module is of the active system (Step 2102).

If the own stream processing module is of the active system ("Yes" as a result of Step 2102), the heartbeat transmission/reception module 132 shifts to the one-second WAIT status, and waits until the transmission of the heartbeat (Step 2103). The WAIT status is cleared in response to the expiration of WAIT time or if receiving the WAIT clearance request due to the system termination request from the stream processing module.

If the WAIT status is cleared, the heartbeat transmission/reception module 132 judges whether or not the system termination request from the stream processing module 120 has caused the WAIT status to be cleared (Step 2104). If the system termination request from the stream processing module 120 has caused the WAIT status to be cleared ("Yes" as a result of Step 2104), the processing by the heartbeat transmission/reception module 132 is terminated (Step 2113).

On the other hand, if the system termination request from the stream processing module 120 has not caused the WAIT status to be cleared ("No" as a result of Step 2104), the heartbeat transmission/reception module 132 has the WAIT status cleared in response to the expiration of WAIT time, and hence issues a request to transmit the heartbeat via the network interface 113 (Step 2105). After transmitting the heartbeat, the heartbeat transmission/reception module 132 waits until another transmission of the heartbeat (Step 2103). The above-mentioned processing is repeated until the end of the system.

If the own stream processing module is not of the active system, in other words, of the standby system ("No" as a result of Step 2102), the heartbeat transmission/reception module 162 shifts to the WAIT status, and waits until the reception of the heartbeat (Step 2106). The WAIT status is cleared if receiving the heartbeat or if receiving the WAIT clearance request due to the system termination request from the stream processing module.

If the WAIT status is cleared, the heartbeat transmission/reception module 162 judges whether or not the system termination request from the stream processing module 150 has caused the WAIT status to be cleared (Step 2107). If the system termination request from the stream processing module 150 has caused the WAIT status to be cleared ("Yes" as a result of Step 2107), the processing by the heartbeat transmission/reception module 162 is terminated (Step 2113).

On the other hand, if the system termination request from the stream processing module 150 has not caused the WAIT status to be cleared ("No" as a result of Step 2107), the heartbeat transmission/reception module 162 has the WAIT status cleared in response to the reception of the heartbeat, and hence issues a request to receive data on the heartbeat via the network interface 113 (Step 2108).

The heartbeat transmission/reception module 162 further judges whether or not the data has been received (Step 2109). If there exists received data ("Yes" as a result of Step 2109), the heartbeat transmission/reception module 162 discards the data on the received heartbeat (Step 2110). After that, the heartbeat transmission/reception module 162 shifts to the 2-second WAIT status again to wait for the reception of the heartbeat (Step 2111). The heartbeat is transmitted from the active system at intervals of one second, but the heartbeat transmission/reception module 162 waits for two seconds in consideration of a delay due to an influence of network congestions or the like. The above-mentioned processing is repeated until the end of the system.

At this time, in the same manner as the WAIT status in the processing of Step 2106, the WAIT status is cleared if receiving the heartbeat or if receiving the WAIT clearance request due to the system termination request from the stream processing module.

On the other hand, if there exists no received data ("No" as a result of Step 2109), the heartbeat transmission/reception module 162 judges that a failure has occurred in the stream processing module 120 of the active system, activates the main control module 153 (Step 2112), and requests the execution of the recovery processing. After completion of the recovery processing, the processing by the heartbeat transmission/reception module 162 is terminated (Step 2113).

According to the embodiment of this invention, all of the information items stored in the memory 112 of the computer 110 of the active system are not transmitted to the computer 140 of the standby system every time, which reduces the data amount to be transmitted and allows to alleviate the load on the network 100.

Further, according to the embodiment of this invention, the queries are not necessarily executed for all of the input stream data items on the computer 140 of the standby system, and hence allows to alleviate the load on the computer 140 of the standby system.

Further, according to the embodiment of this invention, a part or all of the information items stored in the memory 112 of the computer 110 of the active system are periodically transmitted to the standby system, which eliminates the need to apply all of the queries to the input stream data items and allows to quickly recover the computer system from the failure.

While the present invention has been described in detail and pictorially in the accompanying drawings, the present invention is not limited to such detail but covers various obvious modifications and equivalent arrangements, which fall within the purview of the appended claims.

What is claimed is:

1. A failure recovery method for a computer system which receives data to which timestamp information is appended in a chronological order and processes the received data by a plurality of queries that are registered in advance,
   the computer system including a plurality of computers and at least one query group defined therein, the at least one query group including at least one query, wherein a query group is a group of queries executed sequentially, each of the plurality of computers having:
      an interface for receiving the data;
      a memory for storing the data received via the interface; and
      a processor for processing the data stored in the memory, the plurality of computers including:
   a first computer for outputting results obtained by processing the received data by the plurality of queries; and
   a second computer for processing the received data in place of the first computer in a case where a failure occurs in the first computer,
   the plurality of queries being provided with a predefined sequence in which items of the received data are processed,
   the failure recovery method including the steps of:
      receiving the data by each of the first computer and the second computer;
      processing, by the first computer, the items of the received data in order by the plurality of queries in accordance with the predefined sequence;
      storing, by the first computer, the processing results obtained from the received data on a query basis into the memory of the first computer as intermediate data;
      transmitting, by the first computer, the intermediate data corresponding to a part of the plurality of queries to the second computer at a predetermined timing on a query group basis;
      storing, by the second computer, the intermediate data transmitted from the first computer into the memory of the second computer; and
      restoring, by the second computer, in a case where a failure occurs in the first computer, the data stored in the memory of the first computer into the memory of the second computer by processing the data received by the second computer and the intermediate data transmitted from the first computer.

2. The failure recovery method according to claim 1, wherein:
   the at least one query group corresponds to one query included in the plurality of queries;
   and the at least one query group includes the corresponding query and queries to be executed subsequently to the corresponding query.

3. The failure recovery method according to claim 2, further including the step of transmitting, by the first computer, the intermediate data to the second computer based on a sequence in which the queries corresponding to the query groups are executed.

4. The failure recovery method according to claim 2, wherein the at least one query group includes a query group corresponding to all queries included in the plurality of queries.

5. The failure recovery method according to claim 1, wherein:
   the computer system has a plurality of query groups defined therein;
   the plurality of query groups include a query group including all of the plurality of queries; and
   the failure recovery method further includes the steps of deleting, by the second computer, the data received by the second computer in a case of receiving the intermediate data corresponding to the query group including all of the plurality of queries.

6. The failure recovery method according to claim 1, further including the step of transmitting, by the first computer, the intermediate data to the second computer periodically as the predetermined timing.

7. The failure recovery method according to claim 1, further including the step of transmitting at the predetermined timing, by the first computer, the intermediate data to the second computer when, a number of the items of the received data, that have been processed by the plurality of queries exceeds a predetermined threshold.

8. The failure recovery method according to claim 1, further including the steps of:
   communicating, by the first computer, with the second computer in order to notify the second computer that the first computer is operating normally at first predetermined intervals; and
   judging, by the second computer, that a failure has occurred in the first computer if the second computer fails to communicate with the first computer after a second predetermined interval that is longer than the first predetermined interval.

9. The failure recovery method according to claim 1, wherein:
   the memory stores tuple management information created on a query basis;
   the tuple management information has a latest input data timestamp recorded therein, the latest input data timestamp being the timestamp information appended to latest data processed by the query corresponding to the tuple management information; and
   the failure recovery method further includes the steps of:
      transmitting, by the first computer, the tuple management information stored in the memory of the first computer to the second computer along with the intermediate data;
      comparing, by the second computer, the timestamp information appended to the received data with the latest input data timestamp; and
      updating, by the second computer, the latest input data timestamp to the timestamp information appended to the received data in a case where the timestamp information appended to the received data is later than the latest input data timestamp.

10. A computer system, which receives data to which timestamp information is appended in a chronological order and processes the received data by a plurality of queries that are registered in advance, the computer system comprising a plurality of computers and at least one query group defined therein, the at least one query group including at least one query, wherein a query group is a group of queries executed sequentially, each of the plurality of computers comprising:
an interface for receiving the data;
a memory for storing the data received via the interface; and
a processor for processing the data stored in the memory, the plurality of computers including:
a first computer for outputting results obtained by processing the received data by the plurality of queries; and
a second computer for processing the received data in place of the first computer if a failure occurs in the first computer,
the plurality of queries being provided with a predefined sequence in which items of the received data are processed, wherein:
each of the first computer and the second computer is configured to receive the data;
the first computer is configured to process the items of the received data in order by the plurality of queries in accordance with the predefined sequence;
the first computer is configured to store the processing results obtained from the received data on a query basis into the memory of the first computer as intermediate data;
the first computer is configured to transmit the intermediate data corresponding to a part of the plurality of queries to the second computer at a predetermined timing on a query group basis;
the second computer is configured to store the intermediate data transmitted from the first computer into the memory of the second computer; and
in a case where a failure occurs in the first computer, the second computer is configured to restore the data stored in the memory of the first computer into the memory of the second computer by processing the data received by the second computer and the intermediate data transmitted from the first computer.

11. A non-transitory computer readable storage medium recorded with a failure recovery program, which is executed on a first computer included in a computer system that includes at least one query group defined therein, the at least one query group including at least one query, wherein a query group is a group of queries executed sequentially, receives data to which timestamp information is appended in a chronological order and processes the received data by a plurality of queries that are registered in advance, the failure recovery program controlling the first computer to execute the steps of:
receiving the data;
processing items of the received data by the plurality of queries in accordance with a predefined sequence;
storing results obtained by processing the received data by each of the plurality of queries as intermediate data;
transmitting the intermediate data corresponding to a part of the plurality of queries at a predetermined timing on a query group basis;
receiving the intermediate data at a second computer; and
restoring, in a case where a failure occurs in the first computer that has transmitted the intermediate data, the data stored in the first computer that has transmitted the intermediate data by processing the received data and the received intermediate data, at the second computer.

12. The computer system according to claim 10, wherein: the at least one query group corresponds to one query included in the plurality of queries; and the at least one query group includes the corresponding query and queries to be executed subsequently to the corresponding query.

13. The computer system according to claim 12, wherein the first computer is configured to transmit the intermediate data to the second computer based on a sequence in which the queries corresponding to the query groups are executed.

14. The computer system according to claim 12, wherein the at least one query group includes a query group corresponding to all queries included in the plurality of queries.

15. The computer system according to claim 10, wherein:
the computer system has a plurality of query groups defined therein;
the plurality of query groups include a query group including all of the plurality of queries; and wherein
the second computer is configured to delete the data received by the second computer in a case of receiving the intermediate data corresponding to the query group including all of the plurality of queries.

16. The computer system according to claim 10, wherein the first computer is configured to transmit the intermediate data to the second computer periodically as the predetermined timing.

17. The computer system according to claim 10, wherein the first computer is configured to transmit at the predetermined timing the intermediate data to the second computer when, a number of the items of the received data, that have been processed by the plurality of queries exceeds a predetermined threshold.

18. The computer system according to claim 10, wherein the first computer is configured to communicate with the second computer in order to notify the second computer that the first computer is operating normally at first predetermined intervals, and wherein the second computer is configured to judge that a failure has occurred in the first computer if the second computer fails to communicate with the first computer after a second predetermined interval that is longer than the first predetermined interval.

19. The computer system according to claim 10, wherein:
the memory stores tuple management information created on a query basis;
the tuple management information has a latest input data timestamp recorded therein, the latest input data timestamp being the timestamp information appended to latest data processed by the query corresponding to the tuple management information, and wherein:
the first computer is configured to transmit the tuple management information stored in the memory of the first computer to the second computer along with the intermediate data;
the second computer is configured to compare the timestamp information appended to the received data with the latest input data timestamp; and
the second computer is configured to update the latest input data timestamp to the timestamp information appended to the received data in a case where the timestamp information appended to the received data is later than the latest input data timestamp.

20. The non-transitory computer readable storage medium according to claim 11, wherein:
the at least one query group corresponds to one query included in the plurality of queries;
and the at least one query group includes the corresponding query and queries to be executed subsequently to the corresponding query.

21. The non-transitory computer readable storage medium according to claim 11, wherein the failure recovery program further controls the first computer to execute the steps of:
   transmitting the intermediate data based on a sequence in which the queries corresponding to the query groups are executed.

22. The non-transitory computer readable storage medium according to claim 21, wherein the at least one query group includes a query group corresponding to all queries included in the plurality of queries.

23. The non-transitory computer readable storage medium according to claim 11, wherein:
   the computer system has a plurality of query groups defined therein;
   the plurality of query groups include a query group including all of the plurality of queries; and
   the failure recovery program further controls the first computer to execute the steps of:
   deleting, by the second computer, the data received by the second computer in a case of receiving the intermediate data corresponding to the query group including all of the plurality of queries.

24. The non-transitory computer readable storage medium according to claim 11, wherein the failure recovery program further controls the first computer to execute the step of:
   transmitting the intermediate data periodically as the predetermined timing.

25. The non-transitory computer readable storage medium according to claim 11, wherein the failure recovery program further controls the first computer to execute the step of:
   transmitting at the predetermined timing the intermediate data to the second computer when, a number of the items of the received data, that have been processed by the plurality of queries exceeds a predetermined threshold.

26. The non-transitory computer readable storage medium according to claim 11, wherein the failure recovery program further controls the first computer to execute the steps of:
   communicating, by the first computer, with the second computer in order to notify the second computer that the first computer is operating normally at first predetermined intervals; and
   judging, by the second computer, that a failure has occurred in the first computer if the second computer fails to communicate with the first computer after a second predetermined interval that is longer than the first predetermined interval.

27. The non-transitory computer readable storage medium according to claim 11, wherein:
   the memory stores tuple management information created on the a query basis;
   the tuple management information has a latest input data timestamp recorded therein, the latest input data timestamp being the timestamp information appended to latest data processed by the query corresponding to the tuple management information; and
   the failure recovery program further controls the first computer to execute the steps of:
   transmitting the tuple management information stored in the memory of the first computer to the second computer along with the intermediate data;
   comparing, by the second computer, the timestamp information appended to the received data with the latest input data timestamp; and
   updating, by the second computer, the latest input data timestamp to the timestamp information appended to the received data in a case where the timestamp information appended to the received data is later than the latest input data timestamp.

* * * * *